(12) United States Patent
Imai et al.

(10) Patent No.: US 11,869,545 B2
(45) Date of Patent: Jan. 9, 2024

(54) MAGNETIC TAPE MANAGEMENT DEVICE, MAGNETIC TAPE CARTRIDGE, MAGNETIC TAPE, MAGNETIC TAPE SYSTEM, MAGNETIC TAPE MANAGEMENT METHOD, AND PROGRAM

(71) Applicant: FUJIFILM Corporation, Tokyo (JP)

(72) Inventors: Takashi Imai, Minami-ashigara (JP); Kazutoshi Katayama, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/166,156

(22) Filed: Feb. 8, 2023

(65) Prior Publication Data
US 2023/0290384 A1   Sep. 14, 2023

(30) Foreign Application Priority Data
Mar. 14, 2022  (JP) ................ 2022-039720

(51) Int. Cl.
*G11B 33/14*   (2006.01)
(52) U.S. Cl.
CPC ............... *G11B 33/144* (2013.01)
(58) Field of Classification Search
None
See application file for complete search history.

(56) References Cited

U.S. PATENT DOCUMENTS

| | | | | |
|---|---|---|---|---|
| 6,676,026 | B1* | 1/2004 | McKinley | G11B 15/6835 236/91 C |
| 8,941,940 | B1* | 1/2015 | Bayang | G11B 33/144 360/71 |
| 9,888,615 | B1* | 2/2018 | Frink | G11B 33/04 |
| 11,594,261 | B1* | 2/2023 | Cheung | G11B 33/1413 |
| 2007/0230054 | A1 | 10/2007 | Takeda et al. | |
| 2009/0086369 | A1* | 4/2009 | Ishida | G11B 5/82 360/110 |
| 2014/0053588 | A1* | 2/2014 | Karrat | F25D 1/00 62/526 |
| 2018/0286463 | A1* | 10/2018 | Miranda Gavillan | G11B 33/14 |
| 2019/0392864 | A1 | 12/2019 | Bui et al. | |
| 2020/0218318 | A1 | 7/2020 | Tanabe et al. | |

FOREIGN PATENT DOCUMENTS

| | | | |
|---|---|---|---|
| JP | 2005346865 A | * | 12/2005 |
| JP | 2006216195 A | * | 8/2006 |
| JP | 2010250910 A | * | 11/2010 |
| JP | 2020-109020 A | | 7/2020 |
| KR | 101221393 B1 | * | 1/2013 |
| KR | 20180112550 A | * | 10/2018 |
| KR | 20200056545 A | * | 5/2020 |

OTHER PUBLICATIONS

Communication dated Jul. 17, 2023 issued by the European Patent Office in application No. 23160972.8.

* cited by examiner

*Primary Examiner* — William J Klimowicz
(74) *Attorney, Agent, or Firm* — Sughrue Mion, PLLC

(57) ABSTRACT

A magnetic tape management device includes a processor. The processor acquires a temperature and humidity of an environment in which a magnetic tape is stored, derives a specific enthalpy using the temperature and the humidity, and performs management processing on the magnetic tape in accordance with the specific enthalpy.

18 Claims, 21 Drawing Sheets

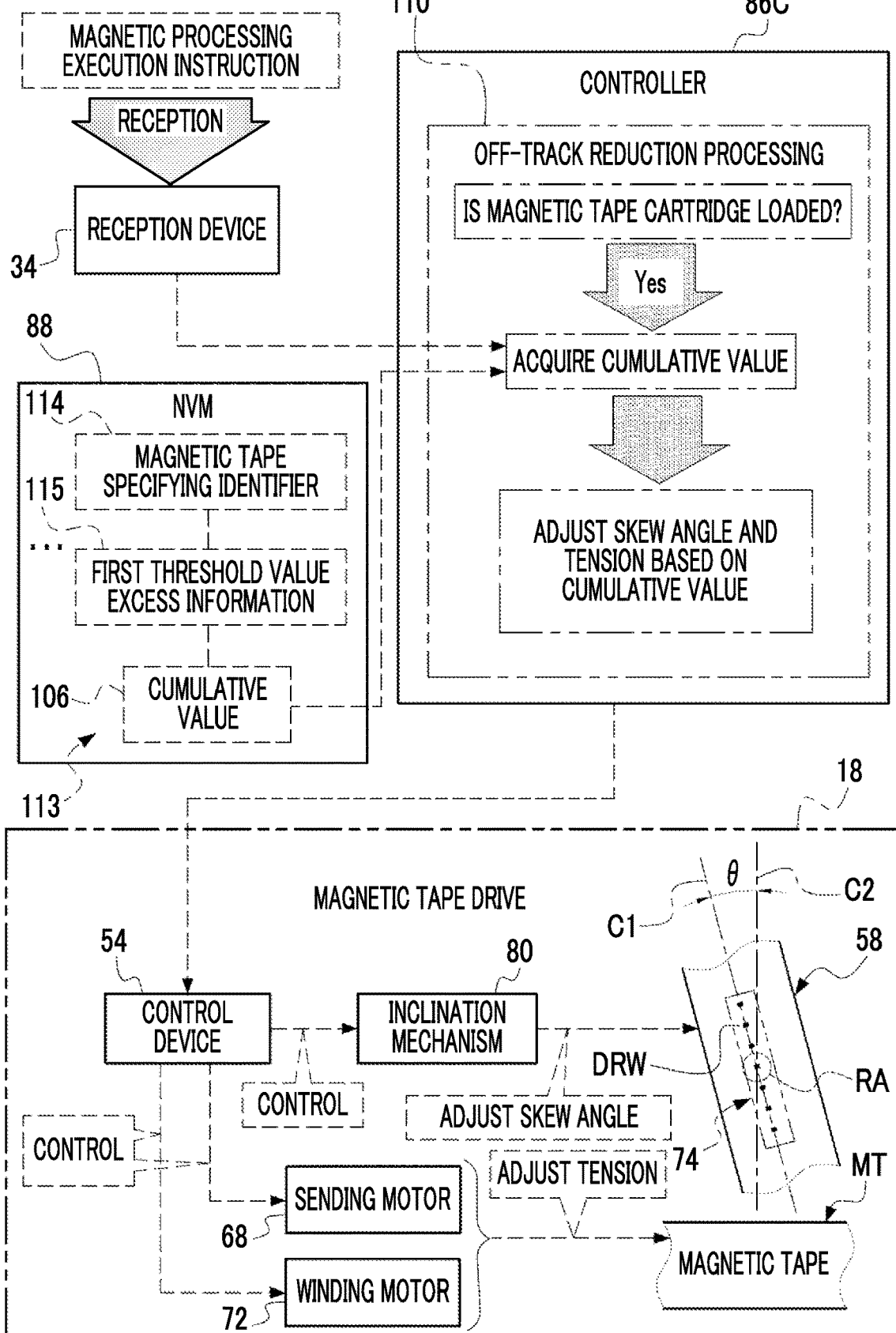

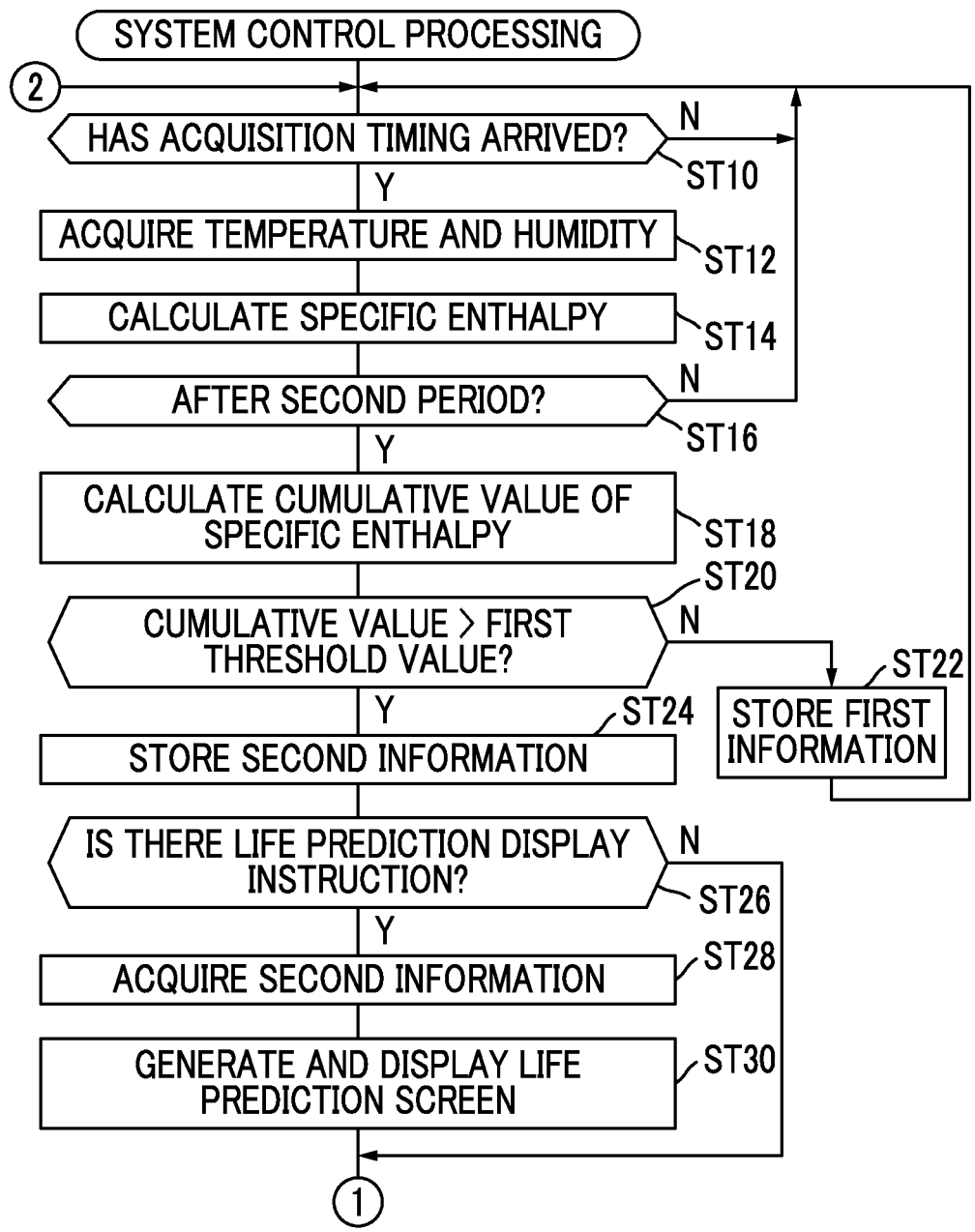

MAGNETIC TAPE MANAGEMENT DEVICE, MAGNETIC TAPE CARTRIDGE, MAGNETIC TAPE, MAGNETIC TAPE SYSTEM, MAGNETIC TAPE MANAGEMENT METHOD, AND PROGRAM

CROSS-REFERENCE TO RELATED APPLICATIONS

This application claims priority under 35 USC 119 from Japanese Patent Application No. 2022-039720 filed on Mar. 14, 2022, the disclosure of which is incorporated by reference herein.

BACKGROUND

1. Technical Field

The technology of the present disclosure relates to a magnetic tape management device, a magnetic tape cartridge, a magnetic tape, a magnetic tape system, a magnetic tape management method, and a program.

2. Related Art

JP2020-109020A discloses a temperature management device comprising a storage unit that stores measurement information including a temperature measured in a predetermined space and a measurement time point of the temperature, and a temperature management unit that extracts a lowest temperature, which is a lowest temperature among the temperatures in the predetermined space included in the measurement information stored in the storage unit, and determines a temperature zone that should be maintained in the predetermined space among a plurality of temperature zones which are different from each other, based on the lowest temperature.

SUMMARY

One embodiment according to the technology of the present disclosure provides a magnetic tape management device capable of managing a quality of a magnetic tape, a magnetic tape cartridge, a magnetic tape, a magnetic tape system, a magnetic tape management method, and a program.

A first aspect according to the technology of the present disclosure relates to a magnetic tape management device comprising a processor, in which the processor acquires a temperature and humidity of an environment in which a magnetic tape is stored, derives a specific enthalpy using the temperature and the humidity, and performs management processing on the magnetic tape in accordance with the specific enthalpy.

A second aspect according to the technology of the present disclosure relates to the magnetic tape management device according to the first aspect, in which the management processing is processing in accordance with a statistic value of the specific enthalpy.

A third aspect according to the technology of the present disclosure relates to the magnetic tape management device according to the second aspect, in which the processor derives the specific enthalpy for each of a plurality of periods, and the statistic value is a statistic value of the specific enthalpy derived for each of the plurality of periods.

A fourth aspect according to the technology of the present disclosure relates to the magnetic tape management device according to the third aspect, in which the plurality of periods are determined by regular time intervals.

A fifth aspect according to the technology of the present disclosure relates to the magnetic tape management device according to any one of the second to fourth aspects, in which the statistic value is a cumulative value of the specific enthalpy.

A sixth aspect according to the technology of the present disclosure relates to the magnetic tape management device according to any one of the second to fifth aspects, in which the management processing includes first output processing of outputting information for specifying that the statistic value exceeds a first threshold value in a case in which the statistic value exceeds the first threshold value.

A seventh aspect according to the technology of the present disclosure relates to the magnetic tape management device according to the sixth aspect, in which the first threshold value is a value determined in accordance with a width deformation amount of the magnetic tape.

An eighth aspect according to the technology of the present disclosure relates to the magnetic tape management device according to any one of the first to seventh aspects, in which first data is recorded in the magnetic tape, and the management processing includes backup processing of backing up the first data to a medium different from the magnetic tape.

A ninth aspect according to the technology of the present disclosure relates to the magnetic tape management device according to any one of the second to seventh aspects cited in the eighth aspect, in which the processor performs the backup processing before the statistic value exceeds a second threshold value and reaches a third threshold value.

A tenth aspect according to the technology of the present disclosure relates to the magnetic tape management device according to the ninth aspect, in which at least the third threshold value out of the second threshold value or the third threshold value is a value determined in accordance with a width deformation amount of the magnetic tape.

An eleventh aspect according to the technology of the present disclosure relates to the magnetic tape management device according to any one of the second to seventh aspects, the second aspect cited in the eighth aspect, the third aspect cited in the eighth aspect, the fourth aspect cited in the eighth aspect, the fifth aspect cited in the eighth aspect, the sixth aspect cited in the eighth aspect, the seventh aspect cited in the eighth aspect, the ninth aspect, or the tenth aspect, in which the management processing includes second output processing of outputting information on the statistic value.

A twelfth aspect according to the technology of the present disclosure relates to the magnetic tape management device according to any one of the first to eleventh aspects, in which a magnetic tape cartridge that accommodates the magnetic tape is stored in the environment.

A thirteenth aspect according to the technology of the present disclosure relates to the magnetic tape management device according to the twelfth aspect, in which a plurality of the magnetic tape cartridges are stored in the environment.

A fourteenth aspect according to the technology of the present disclosure relates to a magnetic tape cartridge comprising a first storage medium in which a result of the management processing performed by the magnetic tape management device according to any one of the first to thirteenth aspects is stored.

A fifteenth aspect according to the technology of the present disclosure relates to a magnetic tape in which a result of the management processing performed by the magnetic tape management device according to any one of the first to thirteenth aspects is recorded.

A sixteenth aspect according to the technology of the present disclosure relates to a magnetic tape system comprising a second storage medium in which a result of the management processing performed by the magnetic tape management device according to any one of the first to thirteenth aspects is stored, and a control device that is operated based on the result stored in the second storage medium.

A seventeenth aspect according to the technology of the present disclosure relates to the magnetic tape system according to the sixteenth aspect, further comprising the magnetic tape management device according to any one of the first to thirteenth aspects.

An eighteenth aspect according to the technology of the present disclosure relates to the magnetic tape system according to the seventeenth aspect, further comprising a rack in which a plurality of magnetic tape cartridges that accommodate a plurality of the magnetic tapes managed by the magnetic tape management device are freely taken in and out.

A nineteenth aspect according to the technology of the present disclosure relates to a magnetic tape management method comprising acquiring a temperature and humidity of an environment in which a magnetic tape is stored, deriving a specific enthalpy using the temperature and the humidity, and performing management processing on the magnetic tape in accordance with the specific enthalpy.

A twentieth aspect according to the technology of the present disclosure relates to a program causing a computer to execute a process comprising acquiring a temperature and humidity of an environment in which a magnetic tape is stored, deriving a specific enthalpy using the temperature and the humidity, and performing management processing on the magnetic tape in accordance with the specific enthalpy.

BRIEF DESCRIPTION OF THE DRAWINGS

Exemplary embodiments of the technology of the disclosure will be described in detail based on the following figures, wherein:

FIG. 16 is a conceptual diagram showing an example of a processing content of off-track reduction processing performed by the controller;

FIG. 17A is a flowchart showing an example of a flow of system control processing.

DETAILED DESCRIPTION

In the following, an example of an embodiment of a magnetic tape management device, a magnetic tape cartridge, a magnetic tape, a magnetic tape system, a magnetic tape management method, and a program according to the technology of the present disclosure will be described with reference to the accompanying drawings.

First, the terms used in the following description will be described.

CPU refers to an abbreviation of "central processing unit". NVM refers to an abbreviation of "non-volatile memory". RAM refers to an abbreviation of "random access memory". EEPROM refers to an abbreviation of "electrically erasable and programmable read only memory". SSD refers to an abbreviation of "solid state drive". HDD refers to an abbreviation of "hard disk drive". I/F refers to an abbreviation of "interface". ASIC refers to an abbreviation of "application specific integrated circuit". FPGA refers to an abbreviation of "field-programmable gate array". PLC refers to an abbreviation of "programmable logic controller". SoC refers to an abbreviation of "system-on-a-chip". IC refers to an abbreviation of "integrated circuit". RFID refers to an abbreviation of "radio frequency identifier". BOT refers to an abbreviation of "beginning of tape". EOT refers to an abbreviation of "end of tape". UI refers to an abbreviation of "user interface". WAN refers to an abbreviation of "wide area network". LAN refers to an abbreviation of "local area network". USB refers to an abbreviation of "Universal Serial Bus". TDS refers to an abbreviation of "transverse dimensional stability".

Figure 1:
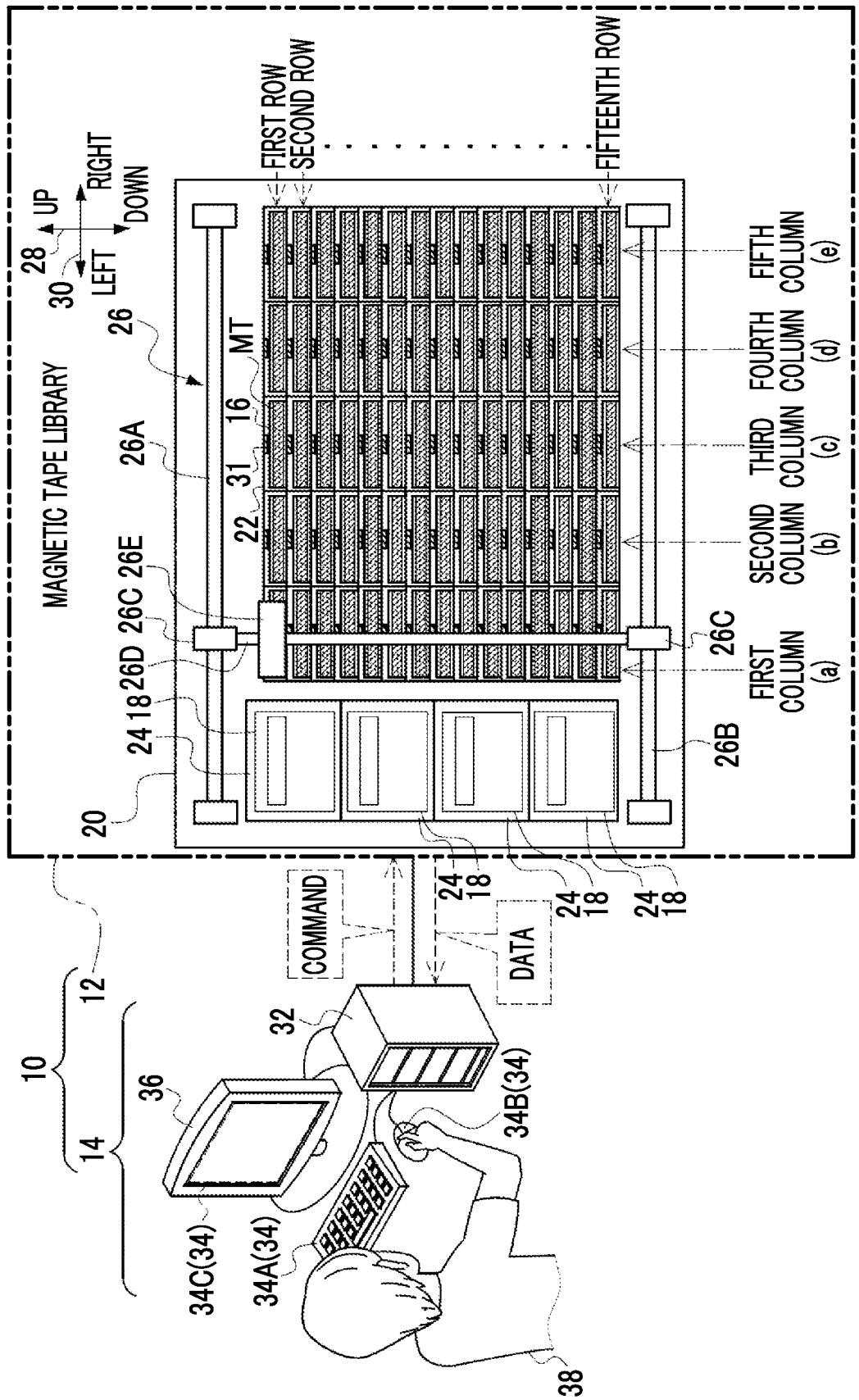
FIG. 1 is a block diagram showing an example of a configuration of a magnetic tape system.

As an example, as shown in FIG. 1, a magnetic tape system 10 comprises a magnetic tape library 12 and a library management device 14. The library management device 14 is electrically connected to the magnetic tape library 12, controls the entire magnetic tape system, and manages the magnetic tape library 12.

The magnetic tape library 12 comprises a plurality of magnetic tape cartridges 16, a plurality of magnetic tape drives 18, and a rack 20. A magnetic tape MT is accommodated in each of the plurality of magnetic tape cartridges 16.

In each of the plurality of magnetic tape drives 18, the magnetic tape cartridge 16 is taken in and out. The plurality of magnetic tape drives 18 are electrically connected to the library management device 14. In a case in which the magnetic tape cartridge 16 is loaded into the magnetic tape drive 18, the magnetic tape drive 18 pulled out the magnetic tape MT from the magnetic tape cartridge 16 and makes the magnetic tape drive 18 travel under the control of the library management device 14. Then, under the control of the library management device 14, in a state in which the magnetic tape MT is made to travel, the magnetic tape drive 18 selectively performs recording the data in the magnetic tape MT and reading (that is, reproducing) the data from the magnetic tape MT.

The plurality of magnetic tape cartridges 16 are accommodated in the rack 20 to be freely taken in and out. The rack 20 is provided with a plurality of cartridge accommodation cells 22, a plurality of drive accommodation cells 24, and a transport mechanism 26.

In the present embodiment, the magnetic tape system 10 is an example of a "magnetic tape system" according to the technology of the present disclosure. In addition, in the present embodiment, the magnetic tape cartridge 16 is an example of a "magnetic tape cartridge" according to the technology of the present disclosure. In addition, in the present embodiment, the magnetic tape MT is an example of a "magnetic tape" according to the technology of the present disclosure.

Each cartridge accommodation cell 22 has a size in which one magnetic tape cartridge 16 can be accommodated, and each cartridge accommodation cell 22 accommodates one magnetic tape cartridge 16. The cartridge accommodation cells 22 are arranged in a lattice form. In the example shown in FIG. 1, the cartridge accommodation cells 22 are arranged in a lattice form of 15 rows×5 columns. In the example shown in FIG. 1, the cartridge accommodation cell 22 having a lattice form of 15 rows×5 columns is shown, but this is merely an example, and the number of the cartridge accommodation cells 22 need only be plural. In addition, FIG. 1 shows an example in which the cartridge accommodation cells 22 are arranged in a lattice form, but this is merely an example, and another arrangement method may be used. In addition, in the example shown in FIG. 1, one rack 20 is shown as an example, but this is merely an example, and the number of the racks 20 may be plural. In this case as well, for example, each rack 20 is provided with the plurality of cartridge accommodation cells 22, the plurality of drive accommodation cells 24, and the transport mechanism 26.

In FIG. 1, as shown by a two-way arrow 28, a direction of an upper side of a front view of FIG. 1 is defined as an upper direction, and a direction of a lower side of the front view of FIG. 1 is defined as a lower direction. In addition, as shown by a two-way arrow 30, a direction on a left side of the front view in FIG. 1 is defined as a left direction, and a direction on a right side of the front view in FIG. 1 is defined as a right direction.

In the example shown in FIG. 1, row numbers 1 to 15 are assigned to rows of the cartridge accommodation cells 22, respectively, in order from the top in FIG. 1, and column symbols a to e are assigned to columns of the cartridge accommodation cells 22, respectively, in order from the left in FIG. 1. A unique cell identifier is applied to the cartridge accommodation cell 22. A position of each cartridge accommodation cell 22 in the rack 20 is specified by the cell identifier. The cell identifier is information including a combination of the row number and the column symbol. For example, a cell identifier of "a1" is applied to the cartridge accommodation cell 22 positioned in the first column and the first row.

An environment sensor 31 is provided in each cartridge accommodation cell 22. The environment sensor 31 measures a temperature and humidity. The environment sensor 31 is attached in the drive accommodation cell 24. Examples of the position at which the environment sensor 31 is attached in the drive accommodation cell 24 include a position derived in advance by a test with an actual machine and/or a computer simulation as a position at which the influences of the temperature and the humidity are most likely to be exerted on the magnetic tape MT in the magnetic tape cartridge 16 accommodated in the drive accommodation cell 24.

One magnetic tape drive 18 is accommodated in each drive accommodation cell 24. In the example shown in FIG. 1, one magnetic tape drive 18 is accommodated in each of four drive accommodation cells 24 arranged in the up-down direction. It should be noted that, in the example shown in FIG. 1, the number of the drive accommodation cells 24 is four, but the technology of the present disclosure is not limited to this, and the number of the drive accommodation cells 24 need only be one or more. In addition, the plurality of drive accommodation cells 24 may be arranged in a lattice form in the up, down, left, or right directions, or may be linearly arranged in the left or right direction.

The transport mechanism 26 is electrically connected to the library management device 14. Under the control of the library management device 14, the transport mechanism 26 takes in and out the magnetic tape cartridge 16 for each cartridge accommodation cell 22, transports the magnetic tape cartridge 16 between each cartridge accommodation cell 22 and each magnetic tape drive 18, and takes in and out the magnetic tape cartridge 16 for each magnetic tape drive 18.

The transport mechanism 26 comprises an upper bar 26A, a lower bar 26B, a pair of horizontally movable robots 26C, a vertical bar 26D, and a vertically movable robot 26E. The upper bar 26A is fixed to an upper part of the rack 20 to extend in a horizontal direction. The lower bar 26B is fixed to a lower part of the rack 20 in parallel with the upper bar 26A.

The pair of horizontally movable robots 26C are attached to both ends of the vertical bar 26D. The pair of horizontally movable robots 26C are fitted in the upper bar 26A and the lower bar 26B. The horizontally movable robot 26C is a self-propelled robot that can move along the horizontal direction. The horizontally movable robot 26C moves the vertical bar 26D in the horizontal direction along the upper bar 26A and the lower bar 26B while holding an orientation of the vertical bar 26D perpendicular to an orientation of the upper bar 26A and the lower bar 26B. The vertically movable robot 26E is attached to the vertical bar 26D. The vertically movable robot 26E is a self-propelled robot that can move along the vertical direction. That is, the vertically movable robot 26E moves in the vertical direction along the vertical bar 26D. The vertically movable robot 26E is provided with a holding unit (not shown) that holds the magnetic tape cartridge 16.

The library management device 14 comprises a library controller 32, a reception device 34, and a display 36. The reception device 34, the display 36, and the magnetic tape library 12 are electrically connected to the library controller 32. The reception device 34 includes a keyboard 34A, a mouse 34B, a touch panel 34C, and the like, and receives an instruction from a user 38.

The library controller 32 is operated in response to the instruction received by the reception device 34. For example, the library controller 32 controls the display 36 in response to the instruction received by the reception device 34. The display 36 displays various pieces of information, such as text information and an image, under the control of the library controller 32. In addition, for example, the library controller 32 gives various commands to the magnetic tape library 12 in response to the instruction received by the reception device 34 to acquire various data from the magnetic tape library 12, and manages the magnetic tape library 12 by using the acquired various data.

Next, an example of a configuration of the magnetic tape cartridge 16 will be described with reference to FIG. 2. It should be noted that, in the following description, for convenience of description, in FIGS. 2 and 3, a loading direction of the magnetic tape cartridge 16 into the magnetic tape drive 18 is indicated by an arrow A, a direction of the arrow A is defined as a front direction of the magnetic tape cartridge 16, and a side of the magnetic tape cartridge 16 in the front direction is defined as a front side of the magnetic tape cartridge 16. In the following description of the structure, "front" refers to the front side of the magnetic tape cartridge 16.

In addition, in the following description, for convenience of description, in FIGS. 2 and 3, a direction of an arrow B orthogonal to the direction of the arrow A is defined as a right direction, and a side of the magnetic tape cartridge 16 in the right direction is defined as a right side of the magnetic tape cartridge 16. In the following description of the structure, "right" refers to the right side of the magnetic tape cartridge 16.

In addition, in the following description, for convenience of description, in FIGS. 2 and 3, a direction opposite to the direction of the arrow B is defined as a left direction, and a side of the magnetic tape cartridge 16 in the left direction is defined as a left side of the magnetic tape cartridge 16. In the following description of the structure, "left" refers to the left side of the magnetic tape cartridge 16.

In addition, in the following description, for convenience of description, in FIGS. 2 and 3, a direction orthogonal to the direction of the arrow A and the direction of the arrow B is indicated by an arrow C, a direction of the arrow C is defined as an upper direction of the magnetic tape cartridge 16, and a side of the magnetic tape cartridge 16 in the upper direction is defined as an upper side of the magnetic tape cartridge 16. In the following description of the structure, "upper" refers to the upper side of the magnetic tape cartridge 16.

In addition, in the following description, for convenience of description, in FIGS. 2 and 3, a direction opposite to the front direction of the magnetic tape cartridge 16 is defined as a rear direction of the magnetic tape cartridge 16, and a side of the magnetic tape cartridge 16 in the rear direction is defined as a rear side of the magnetic tape cartridge 16. In the following description of the structure, "rear" refers to the rear side of the magnetic tape cartridge 16.

In addition, in the following description, for convenience of description, in FIGS. 2 and 3, a direction opposite to the upper direction of the magnetic tape cartridge 16 is defined as a lower direction of the magnetic tape cartridge 16, and a side of the magnetic tape cartridge 16 in the lower direction is defined as a lower side of the magnetic tape cartridge 16. In the following description of the structure, "lower" refers to the lower side of the magnetic tape cartridge 16.

Figure 2:
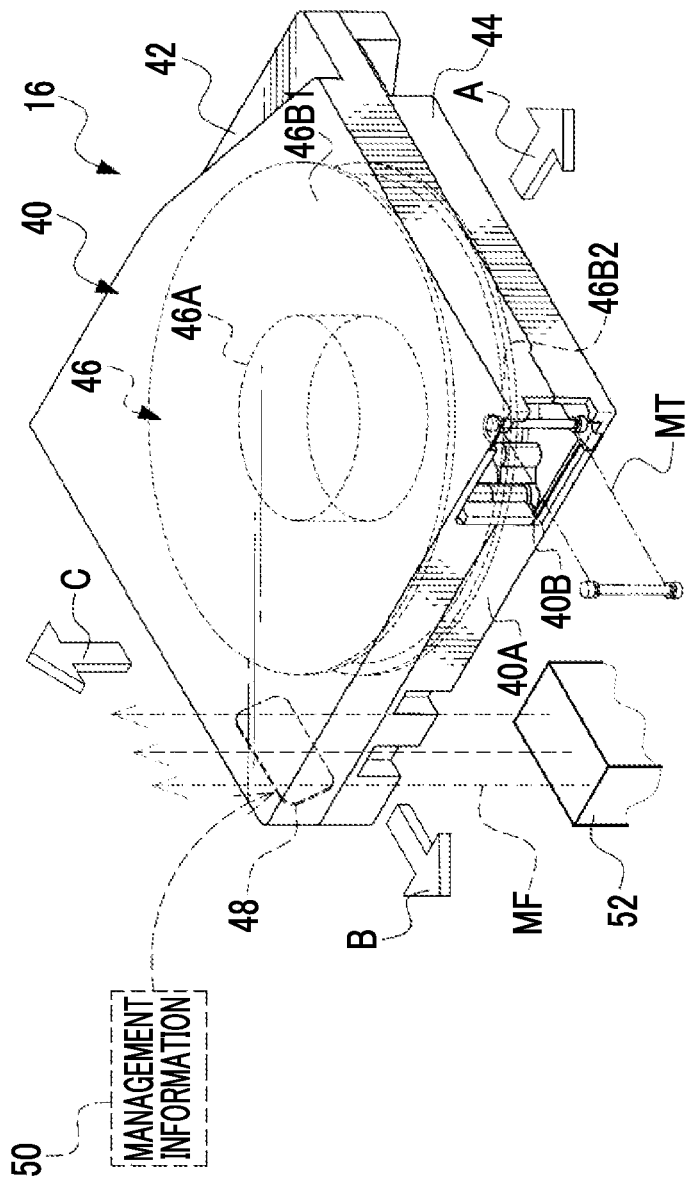
FIG. 2 is a schematic perspective view of an example of an appearance of a magnetic tape cartridge.

As an example, as shown in FIG. 2, the magnetic tape cartridge 16 has a substantially rectangular shape in a plan view, and comprises a case 40 having a flat shape and a box shape. The magnetic tape MT is accommodated in the case 40. The case 40 is made of resin, such as polycarbonate, and comprises an upper case 42 and a lower case 44. The upper case 42 and the lower case 44 are bonded by welding (for example, ultrasound welding) and screwing in a state in which a lower peripheral edge surface of the upper case 42 and an upper peripheral edge surface of the lower case 44 are brought into contact with each other. The bonding method is not limited to welding and screwing, and other bonding methods may be used.

A sending reel 46 is rotatably accommodated inside the case 40. The sending reel 46 comprises a reel hub 46A, an upper flange 46B1, and a lower flange 46B2. The reel hub 46A is formed in a cylindrical shape. The reel hub 46A is an axial center portion of the sending reel 46, has an axial center direction along an up-down direction of the case 40, and is disposed in a center portion of the case 40. Each of the upper flange 46B1 and the lower flange 46B2 is formed in an annular shape. A center portion of the upper flange 46B1 in a plan view is fixed to an upper end portion of the reel hub 46A, and a center portion of the lower flange 46B2 in a plan view is fixed to a lower end portion of the reel hub 46A. It should be noted that the reel hub 46A and the lower flange 46B2 may be integrally molded.

The magnetic tape MT is wound around an outer peripheral surface of the reel hub 46A, and an end portion of the magnetic tape MT in a width direction is held by the upper flange 46B1 and the lower flange 46B2.

An opening 40B is formed on a front side of a right wall 40A of the case 40. The magnetic tape MT is pulled out from the opening 40B.

A cartridge memory 48 is provided in the lower case 44. Specifically, the cartridge memory 48 is accommodated in a right rear end portion of the lower case 44. An IC chip including an NVM is mounted on the cartridge memory 48. In the present embodiment, a so-called passive RFID tag is adopted as the cartridge memory 48, and the read/write of various pieces of information is performed with respect to the cartridge memory 48 in a noncontact manner. It should be noted that, in the present embodiment, the form example has been described in which the cartridge memory 48 is provided in the lower case 44, but the technology of the present disclosure is not limited to this, and the cartridge memory 48 need only be provided in the case 40 at a position at which various pieces of information can be read and written in a noncontact manner.

Management information 50 is stored in the cartridge memory 48. The management information 50 is information for managing the magnetic tape cartridge 16. For example, the management information 50 includes information on the case 40, information on the cartridge memory 48, information on the magnetic tape drive 18, information on the magnetic tape MT accommodated in the magnetic tape cartridge 16, and the like.

The management information 50 is read and written from and to the cartridge memory 48 in a noncontact manner by a noncontact read/write device 52. The noncontact read/write device 52 releases a magnetic field MF to the cartridge memory 48 and performs noncontact communication with the cartridge memory 48 via the magnetic field MF to write the management information 50 to the cartridge memory 48 or read the management information 50 from the cartridge memory 48.

Figure 3:
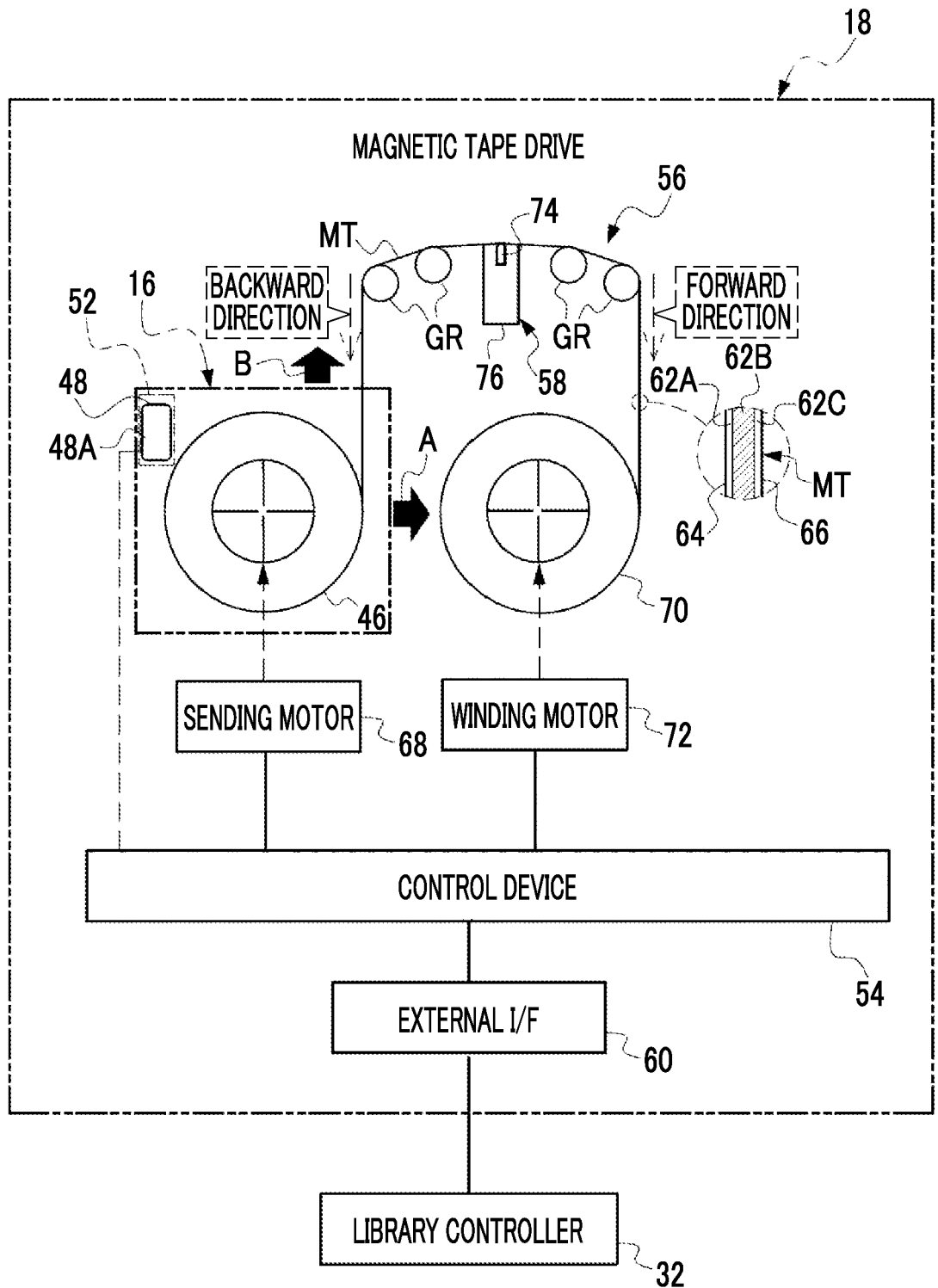
FIG. 3 is a schematic configuration diagram showing an example of a hardware configuration of a magnetic tape drive.

As shown in FIG. 3 as an example, the magnetic tape drive 18 comprises a control device 54, a travel device 56, a magnetic head 58, and an external I/F 60.

The magnetic tape cartridge 16 is loaded into the magnetic tape drive 18 along the direction of the arrow A. In the magnetic tape drive 18, the magnetic tape MT is pulled out from the magnetic tape cartridge 16 and used. The magnetic tape drive 18 controls the entire magnetic tape drive 18 (for example, the travel device 56, the magnetic head 58, and the like) by using the management information 50 (see FIG. 2) and the like stored in the cartridge memory 48.

The magnetic tape MT has a magnetic layer 62A, a base film 62B, and a back coating layer 62C. The magnetic layer 62A is formed on one surface side of the base film 62B, and the back coating layer 62C is formed on the other surface side of the base film 62B. The data is recorded in the magnetic layer 62A. The magnetic layer 62A contains ferromagnetic powder. As the ferromagnetic powder, for example, ferromagnetic powder generally used in the magnetic layer of various magnetic recording media is used. Preferable specific examples of the ferromagnetic powder include hexagonal ferrite powder. Examples of the hexagonal ferrite powder include hexagonal strontium ferrite powder and hexagonal barium ferrite powder. The back coating layer 62C is a layer containing non-magnetic powder, such as carbon black. The base film 62B is also referred to as a support, and is made of, for example, polyethylene terephthalate, polyethylene naphthalate, or polyamide. It should be noted that a non-magnetic layer may be formed between the base film 62B and the magnetic layer 62A. In the magnetic tape MT, a surface on which the magnetic layer 62A is formed is a front surface 64 of the magnetic tape MT, and a surface on which the back coating layer 62C is formed is a back surface 66 of the magnetic tape MT.

The magnetic tape drive 18 performs magnetic processing on the front surface 64 of the magnetic tape MT by using the magnetic head 58 in a state in which the magnetic tape MT is made to travel. Here, the magnetic processing refers to recording the data in the front surface 64 of the magnetic tape MT and reading the data (that is, reproducing the data) from the front surface 64 of the magnetic tape MT. In the present embodiment, the magnetic tape drive 18 selectively records the data in the front surface 64 of the magnetic tape MT and reads the data from the front surface 64 of the magnetic tape MT by using the magnetic head 58. That is, the magnetic tape drive 18 pulls out the magnetic tape MT from the magnetic tape cartridge 16, records the data in the front surface 64 of the pulled out magnetic tape MT by using the magnetic head 58, or reads the data from the front surface 64 of the pulled out magnetic tape MT by using the magnetic head 58.

The control device 54 controls the entire magnetic tape drive 18. In the present embodiment, although the control device 54 is realized by an ASIC, the technology of the present disclosure is not limited to this. For example, the control device 54 may be realized by an FPGA and/or a PLC. In addition, the control device 54 may be realized by the computer including a CPU, a flash memory (for example, an EEPROM and/or an SSD), and a RAM. In addition, the control device 54 may be realized by combining two or more of an ASIC, an FPGA, a PLC, and a computer. That is, the control device 54 may be realized by a combination of a hardware configuration and a software configuration.

The external I/F 60 is connected to the control device 54. In addition, the external I/F 60 is connected to the library controller 32 via a communication network, such as a WAN and/or a LAN. Examples of the external I/F 60 include a USB interface. The external I/F 60 controls the exchange of various pieces of information (for example, data to be recorded in the magnetic tape MT, data read from the magnetic tape MT, and/or a signal given to the control device 54) between the control device 54 and the library controller 32.

The travel device 56 is a device that selectively makes the magnetic tape MT travel along a predetermined path in a forward direction and a backward direction, and comprises a sending motor 68, a winding reel 70, a winding motor 72, and a plurality of guide rollers GR. It should be noted that, here, the forward direction refers to a sending direction of the magnetic tape MT, and the backward direction refers to a rewinding direction of the magnetic tape MT.

The sending motor 68 rotates the sending reel 46 in the magnetic tape cartridge 16 under the control of the control device 54. The control device 54 controls the sending motor 68 to control a rotation direction, a rotation speed, a rotation torque, and the like of the sending reel 46.

The winding motor 72 rotates the winding reel 70 under the control of the control device 54. The control device 54 controls the winding motor 72 to control a rotation direction, a rotation speed, a rotation torque, and the like of the winding reel 70.

In a case in which the magnetic tape MT is wound by the winding reel 70, the control device 54 rotates the sending motor 68 and the winding motor 72 such that the magnetic tape MT travels along the predetermined path in the forward direction. The rotation speed, the rotation torque, and the like of the sending motor 68 and the winding motor 72 are adjusted in accordance with a speed at which the magnetic tape MT is wound around the winding reel 70. In addition, by adjusting the rotation speed, the rotation torque, and the like of each of the sending motor 68 and the winding motor 72 by the control device 54, the tension is applied to the magnetic tape MT. In addition, the tension applied to the magnetic tape MT is controlled by adjusting the rotation speed, the rotation torque, and the like of each of the sending motor 68 and the winding motor 72 by the control device 54.

It should be noted that, in a case in which the magnetic tape MT is rewound to the sending reel 46, the control device 54 rotates the sending motor 68 and the winding motor 72 such that the magnetic tape MT travels along the predetermined path in the backward direction.

In the present embodiment, the tension applied to the magnetic tape MT is controlled by controlling the rotation speed, the rotation torque, and the like of the sending motor 68 and the winding motor 72, but the technology of the present disclosure is not limited to this. For example, the tension applied to the magnetic tape MT may be controlled by using a dancer roller, or may be controlled by drawing the magnetic tape MT into a vacuum chamber.

Each of the plurality of guide rollers GR is a roller which guides the magnetic tape MT. The predetermined path, that is, a traveling path of the magnetic tape MT is determined by separately disposing the plurality of guide rollers GR at positions straddling the magnetic head 58 between the magnetic tape cartridge 16 and the winding reel 70.

The magnetic head 58 comprises a magnetic element unit 74 and a holder 76. The magnetic element unit 74 is held by the holder 76 to come into contact with the traveling magnetic tape MT. The magnetic element unit 74 includes a plurality of magnetic elements.

The magnetic element unit 74 records the data in the magnetic tape MT traveling along the predetermined path by the travel device 56, or reads the data from the magnetic tape MT traveling along the predetermined path by the travel device 56.

In the magnetic tape drive 18, the noncontact read/write device 52 is disposed to face a back surface 48A of the cartridge memory 48 on the lower side of the magnetic tape cartridge 16 in a state in which the magnetic tape cartridge 16 is loaded. The noncontact read/write device 52 is electrically connected to the control device 54. The noncontact read/write device 52 reads and writes the information (for example, the management information 50 (see FIG. 2)) from and to the cartridge memory 48 in a noncontact manner under the control of the control device 54.

Figure 4:
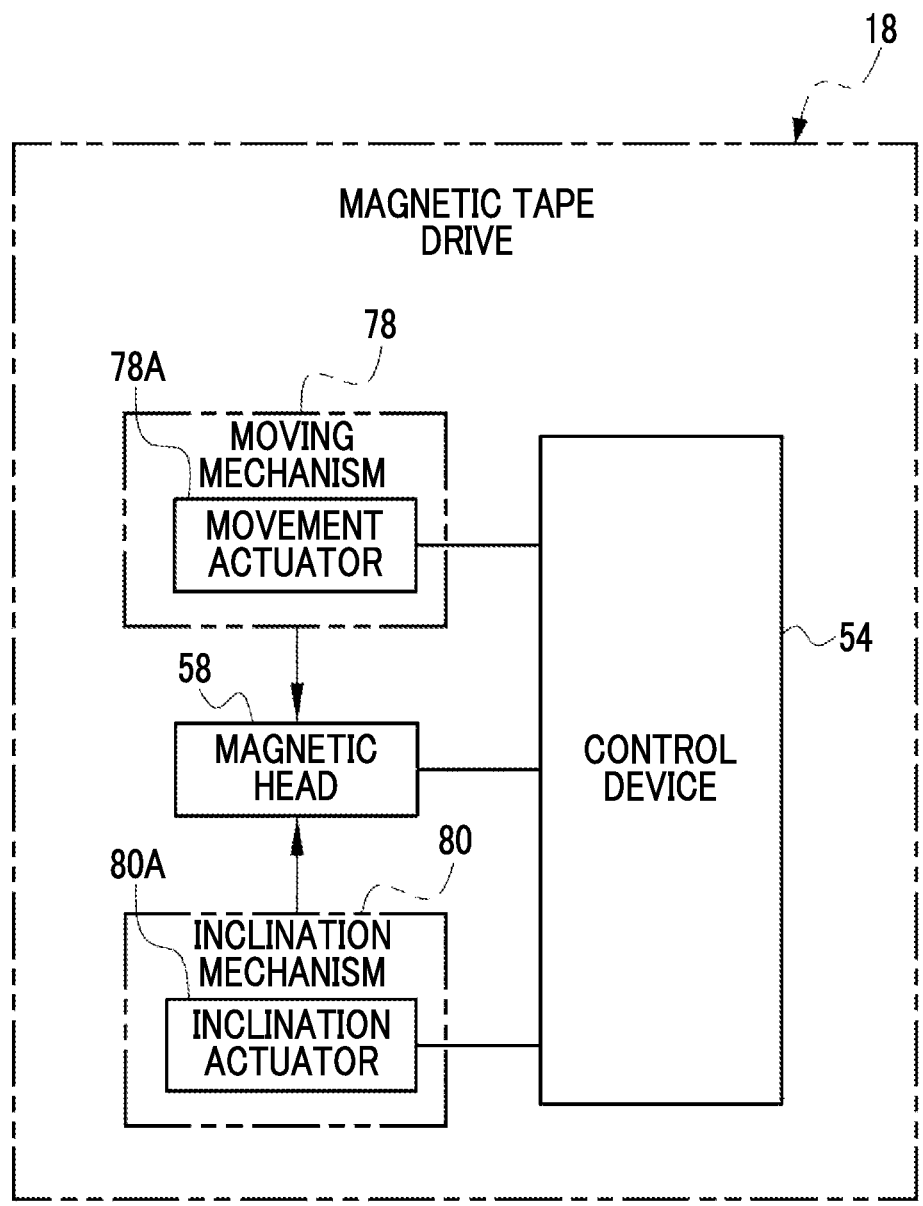
FIG. 4 is a block diagram showing an example of the hardware configuration of the magnetic tape drive.

As an example, as shown in FIG. 4, the magnetic tape drive 18 comprises a moving mechanism 78. The moving mechanism 78 includes a movement actuator 78A. Examples of the movement actuator 78A include a voice coil motor and/or a piezo actuator. The movement actuator 78A is connected to the control device 54, and the control device 54 controls the movement actuator 78A. The movement actuator 78A generates power under the control of the control device 54. The moving mechanism 78 moves the magnetic head 58 in the width direction of the magnetic tape MT by receiving the power generated by the movement actuator 78A.

The magnetic tape drive 18 comprises an inclination mechanism 80. The inclination mechanism 80 includes an inclination actuator 80A. Examples of the inclination actuator 80A include a voice coil motor and/or a piezo actuator. The inclination actuator 80A is connected to the control device 54, and the control device 54 controls the inclination actuator 80A. The inclination actuator 80A generates power under the control of the control device 54. The inclination mechanism 80 inclines the magnetic head 58 to a longitudinal direction side of the magnetic tape MT with respect to a width direction of the magnetic tape MT by receiving the power generated by the inclination actuator 80A. That is, the magnetic head 58 is skewed on the magnetic tape MT by applying power from the inclination mechanism 80 under the control of the control device 54.

Figure 5:
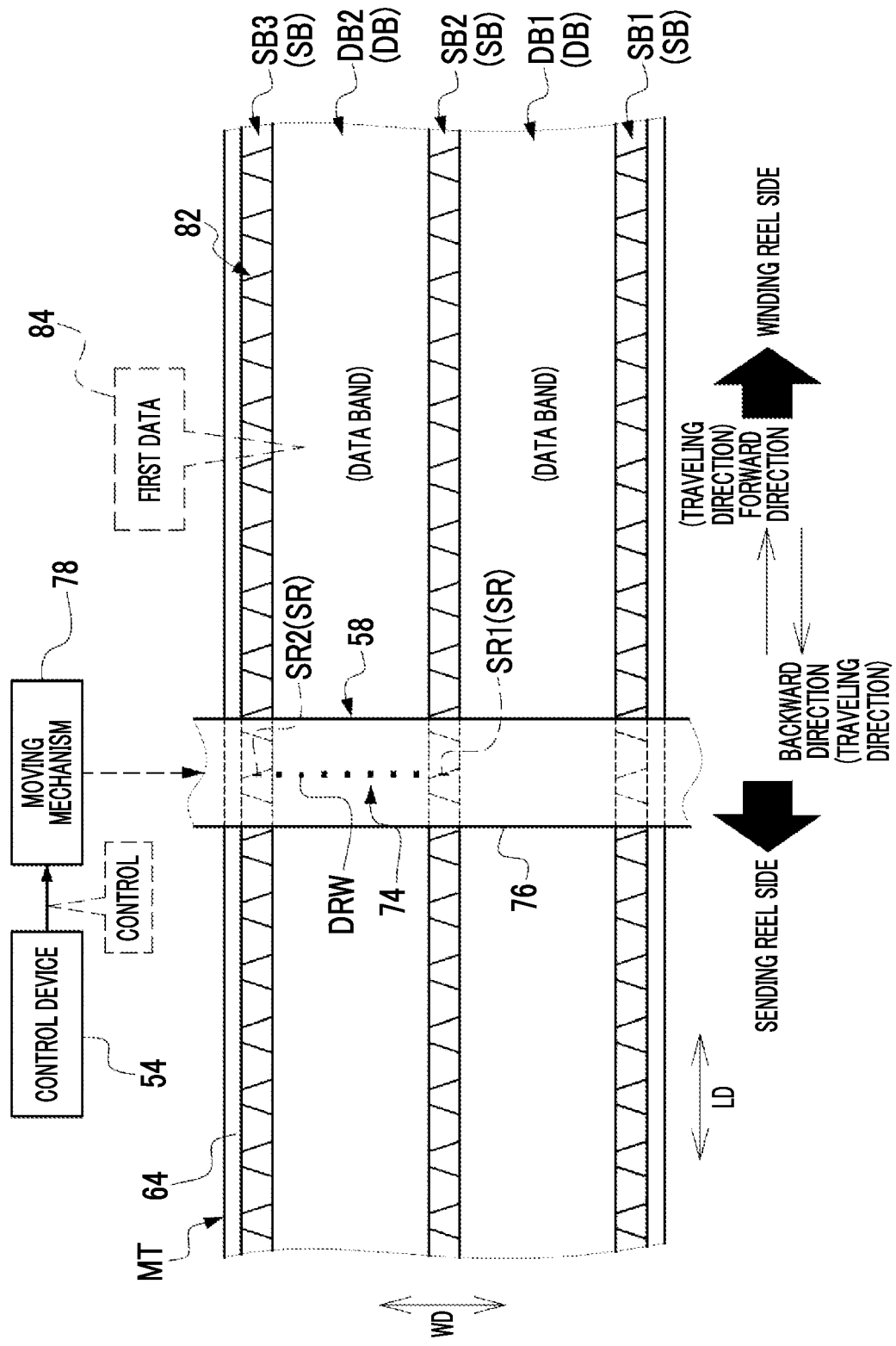
FIG. 5 is a conceptual diagram showing an example of a relative relationship between a magnetic tape and a magnetic head in a case in which data is recorded in a data band or a signal in the data band is reproduced while the magnetic head travels on the magnetic tape.

As an example, as shown in FIG. 5, on the front surface 64 of the magnetic tape MT, servo bands SB1, SB2, and SB3 are data bands DB1 and DB2 are formed. It should be noted that, in the following, for convenience of description, in a case in which the distinction is not specifically needed, the servo bands SB1 to SB3 are referred to as a servo band SB, and the data bands DB1 and DB2 are referred to as the data band DB.

The servo bands SB1 to SB3 and the data bands DB1 and DB2 are formed along the longitudinal direction LD (that is, a total length direction) of the magnetic tape MT. Here, the total length direction of the magnetic tape MT refers to the traveling direction of the magnetic tape MT, in other words. The traveling direction of the magnetic tape MT is defined in two directions of the forward direction which is a direction in which the magnetic tape MT travels from the sending reel 46 side to the winding reel 70 side (hereinafter, also simply referred to as "forward direction"), and the backward direction which is a direction in which the magnetic tape MT travels from the winding reel 70 side to the sending reel 46 side (hereinafter, also simply referred to as "backward direction").

The servo bands SB1 to SB3 are arranged at positions spaced in the width direction WD of the magnetic tape MT (hereinafter, also simply referred to as "width direction WD"). For example, the servo bands SB1 to SB3 are arranged at equal intervals along the width direction WD. It should be noted that, in the present embodiment, "equal interval" refers to the equal interval in the sense of including an error generally allowed in the technical field to which the technology of the present disclosure belongs, that is the error to the extent that it does not contradict the purpose of the technology of the present disclosure, in addition to the exact equal interval.

The data band DB1 is disposed between the servo band SB1 and the servo band SB2, and the data band DB2 is disposed between a servo band SB2 and a servo band SB3. That is, the servo bands SB and the data bands DB are arranged alternately along the width direction WD.

It should be noted that, in the example shown in FIG. 5, for convenience of description, three servo bands SB and two data bands DB are shown, but these are merely examples, and two servo bands SB and one data band DB may be used, and the technology of the present disclosure is established even in a case in which four or more servo bands SB and three or more data bands DB are used.

A plurality of servo patterns 82 are recorded in the servo band SB along the longitudinal direction LD of the magnetic tape MT. The plurality of servo patterns 82 are disposed at regular intervals along the longitudinal direction LD of the magnetic tape MT. It should be noted that, in the present embodiment, "regular" refers to the regularity in the sense of including an error generally allowed in the technical field to which the technology of the present disclosure belongs, which is the error to the extent that it does not contradict the purpose of the technology of the present disclosure, in addition to the exact regularity.

The magnetic head 58 is disposed on the front surface 64 side of the magnetic tape MT configured as described above. The holder 76 is formed in a rectangular parallelepiped shape, and is disposed to cross the front surface 64 of the magnetic tape MT along the width direction WD. The plurality of magnetic elements of the magnetic element unit 74 are arranged in a straight line along the longitudinal direction of the holder 76. The magnetic element unit 74 has a pair of servo reading elements SR and a plurality of data read/write elements DRW as the plurality of magnetic elements. A length of the holder 76 in the longitudinal direction is sufficiently long with respect to the width of the magnetic tape MT. For example, the length of the holder 76 in the longitudinal direction is set to a length exceeding the width of the magnetic tape MT even in a case in which the magnetic element unit 74 is disposed at any position on the magnetic tape MT.

The pair of servo reading elements SR are mounted on the magnetic head 58. In the magnetic head 58, a relative positional relationship between the holder 76 and the pair of servo reading elements SR is fixed. The pair of servo reading elements SR consists of servo reading elements SR1 and SR2. The servo reading element SR1 is disposed at one end of the magnetic element unit 74, and the servo reading element SR2 is disposed at the other end of the magnetic element unit 74. In the example shown in FIG. 5, the servo reading element SR1 is provided at a position corresponding to the servo band SB2, and the servo reading element SR2 is provided at a position corresponding to the servo band SB3.

The plurality of data read/write elements DRW are disposed in a straight line between the servo reading element SR1 and the servo reading element SR2. The plurality of data read/write elements DRW are disposed at intervals along the longitudinal direction of the holder 76 (for example, are disposed at equal intervals along the longitudinal direction of the holder 76). In the example shown in FIG. 5, the plurality of data read/write elements DRW are provided at positions corresponding to the data band DB2.

The control device 54 acquires a servo pattern signal which is a result of reading the servo pattern 82 by the servo reading element SR in a state in which the magnetic tape MT travels in the forward direction or the backward direction, and performs a servo control in response to the acquired servo pattern signal. Here, the servo control refers to a control of moving the magnetic head 58 in the width direction WD of the magnetic tape MT by operating the moving mechanism 78 in accordance with the servo pattern 82 read by the servo reading element SR.

By performing the servo control, the plurality of data read/write elements DRW are positioned on a designated region in the data band DB, and perform the magnetic processing on the designated region in the data band DB in this state. In the example shown in FIG. 5, the plurality of data read/write elements DRW perform the magnetic processing on the designated region in the data band DB2.

In addition, in a case in which the data band DB of which the data is to be read by the magnetic element unit 74 is changed (in the example shown in FIG. 5, the data band DB of which the data is to be read by the magnetic element unit 74 is changed from the data band DB2 to the data band DB1), the moving mechanism 78 moves, under the control of the control device 54, the magnetic head 58 in the width direction WD to change the position of the pair of servo reading elements SR. That is, by moving the magnetic head 58 in the width direction WD, the moving mechanism 78 moves the servo reading element SR1 to a position corresponding to the servo band SB1 and moves the servo reading element SR2 to the position corresponding to the servo band SB2. As a result, the positions of the plurality of data read/write elements DRW are changed from the data band DB2 to the data band DB1, and the plurality of data read/write elements DRW perform the magnetic processing on the data band DB1.

In the example shown in FIG. 5, the data recorded in the data band DB is shown as first data 84. That is, the plurality of data read/write elements DRW record the first data 84 in the data band DB in parallel, and the plurality of data read/write elements DRW read the first data 84 from the data band DB in parallel. The first data 84 is an example of "first data" according to the technology of the present disclosure.

By the way, in recent years, research on a technology for reducing the influence of TDS has been advanced. It is known that the TDS is influenced by the temperature, the humidity, the tension at which the magnetic tape MT is wound around the reel (for example, various reels, such as the sending reel 46), the pressure, the temporal deterioration, and the like, in a case in which no measures are taken, the TDS is increased and the reproduction of the first data 84 recorded in the data band DB cannot be performed with high accuracy (that is, reproduction failure occurs) due to the occurrence of the misregistration of the data read/write element DRW with respect to the track in the data band DB in a situation in which the magnetic processing for the data band DB is performed, and further, in a case in which the misregistration of the data read/write element DRW with respect to the track is large, the off-track occurs and the reproduction of the first data 84 recorded in the data band DB (that is, the reproduction of the first data 84 recorded in the data band DB before an off-track state) cannot be performed. In a case in which the off-track occurs, in addition to the influence on the reproduction of the first data 84, there is also a concern that the first data 84 may be erroneously recorded in an existing track (for example, a track that is not desired to be overwritten) in a case in which recording and/or addition to an adjacent track in the data band DB is performed.

Figure 6:
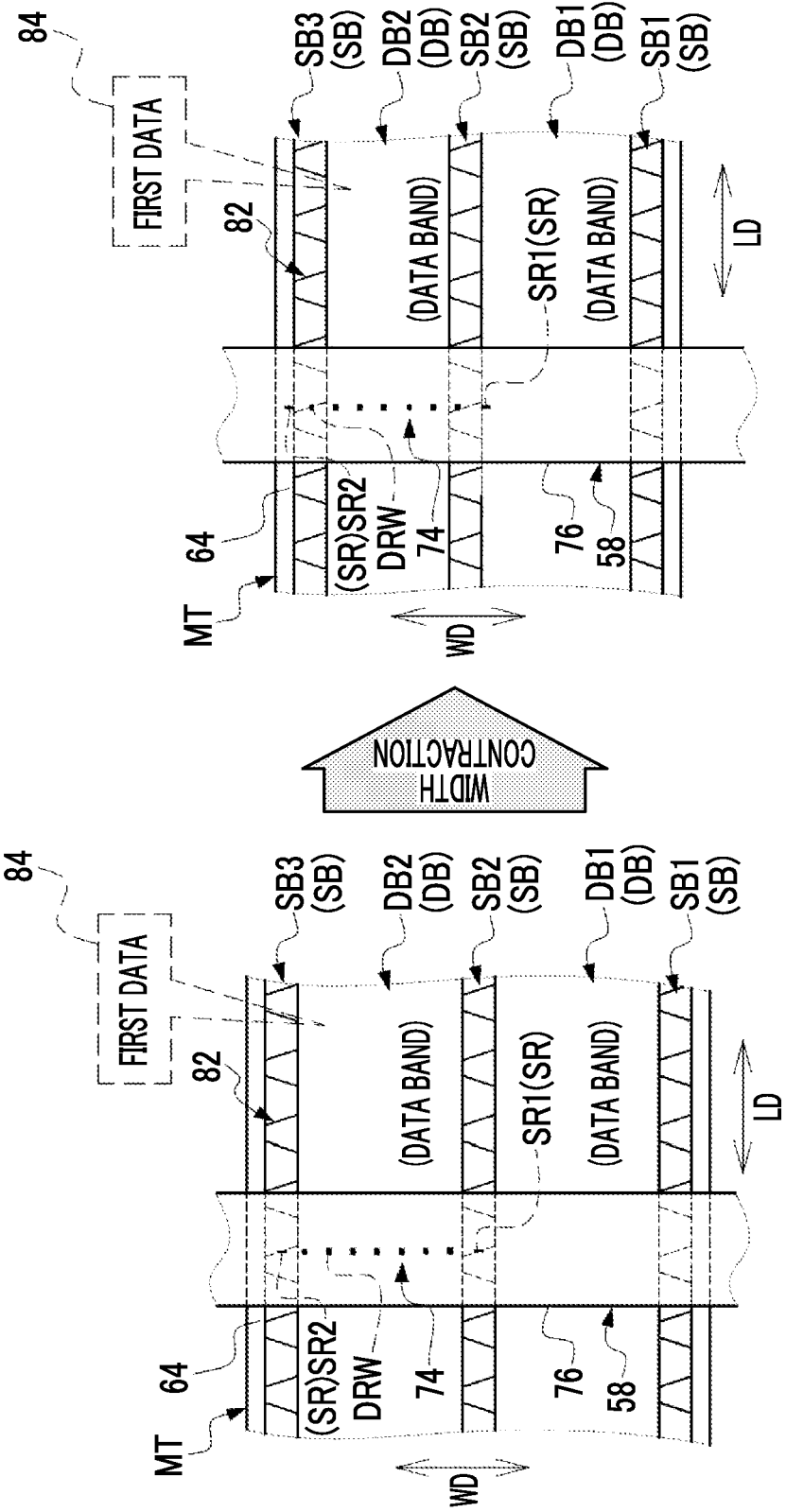
FIG. 6 is a conceptual diagram showing an example of an aspect in which the magnetic tape before and after a width of the magnetic tape contracts is observed from a front surface side of the magnetic tape.

In the example shown in FIG. 6, an aspect is shown in which the width of the magnetic tape MT contracts with the elapse of time. In this case, the reproduction failure of the first data 84 and/or the off-track are likely to occur. It should be noted that the reproduction failure and off-track referred to here are phenomena that occur in a state in which the data read/write element DRW is not positioned on a designated track among a plurality of tracks that are present in the data band DB (that is, a state in which the position of the designated track and the position of the data read/write element DRW deviate from each other in the width direction WD).

In some cases, the width of the magnetic tape MT expands, and the off-track occurs in this case as well. That is, in a case in which the width of the magnetic tape MT contracts or expands with the elapse of time, the position of the servo reading element SR with respect to the servo pattern 82 diverges from a predetermined position (that is, a predetermined position in design with respect to the servo pattern 82) determined in design in the width direction WD. In a case in which the position of the servo reading element SR with respect to the servo pattern 82 diverges from the predetermined position determined by the design in the width direction WD, the accuracy of the servo control is deteriorated, and the position of the track in the data band DB and the position of the data read/write element DRW deviate from each other. Then, an originally planned track will not be subjected to the magnetic processing.

Figure 7:
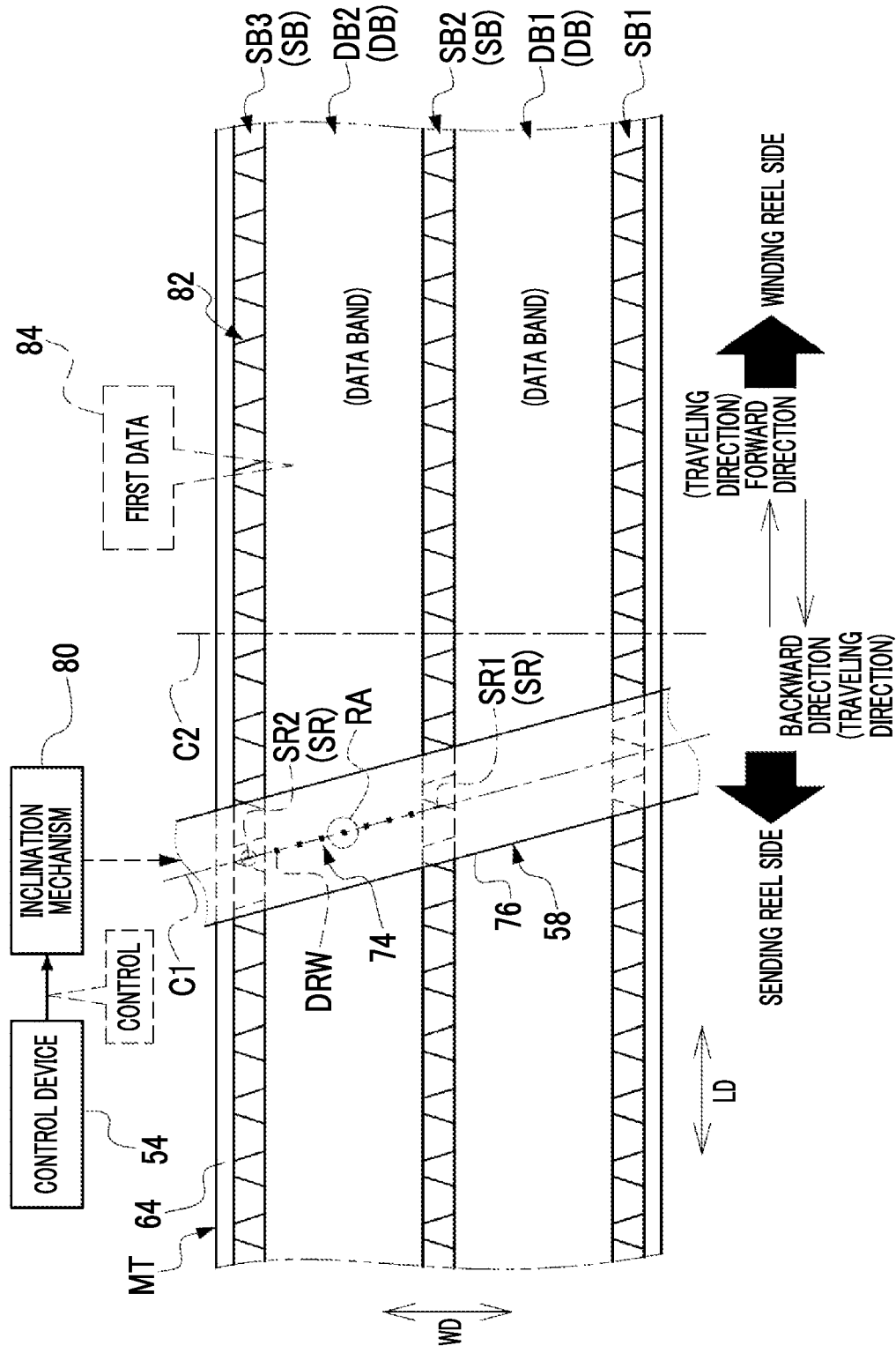
FIG. 7 is a conceptual diagram showing an example of an aspect in which a state in which the magnetic head is skewed on the magnetic tape is observed from the front surface side of the magnetic tape.

As a method of reducing the influence of the TDS, as shown in FIG. 7 as an example, a method of holding the position of the servo reading element SR with respect to the servo pattern 82 at the predetermined position determined by design by skewing the magnetic head 58 on the magnetic tape MT is known. In addition, as a method of reducing the influence of the TDS, a method of adjusting the tension applied to the magnetic tape MT is also known.

The magnetic head 58 comprises a rotation axis RA. The rotation axis RA is provided at a position corresponding to a center portion of the magnetic element unit 74 provided in the magnetic head 58 in a plan view. The magnetic head 58 is rotatably held by the inclination mechanism 80 via the rotation axis RA. It should be noted that, in the present embodiment, the operation of inclining the magnetic head 58 with respect to the width direction WD by rotating the magnetic head 58 on the front surface 64 with the rotation axis RA as a central axis along the front surface 64 is referred to as "skew".

An imaginary straight line C1 which is an imaginary center line is provided in the magnetic head 58. The imaginary straight line C1 is a straight line that passes through the rotation axis RA and extends in the longitudinal direction of the holder 76 in a plan view (that is, the direction in which the plurality of data read/write elements DRW are arranged). The magnetic head 58 is disposed in an inclined posture with respect to the width direction WD along the front surface 64 (in other words, a posture in which the imaginary straight line C1 is inclined with respect to the imaginary straight line C2, which is an imaginary straight line along the width direction WD, along the front surface 64). In the example shown in FIG. 7, the magnetic head 58 is held by the inclination mechanism 80 to have a posture in which the imaginary straight line C1 is inclined to the longitudinal direction LD side of the magnetic tape MT with respect to an imaginary straight line C2. In addition, in the example shown in FIG. 7, the magnetic head 58 is held by the inclination mechanism 80 in a posture in which the imaginary straight line C1 is inclined toward the sending reel 46 side with respect to the imaginary straight line C2 (that is, a posture inclined counterclockwise as viewed from a paper surface side of FIG. 7). An angle formed by the imaginary straight line C1 and the imaginary straight line C2 corresponds to an angle at which the magnetic head 58 is inclined with respect to the width direction WD by rotating the magnetic head 58 on the front surface 64 with the rotation axis RA as a central axis along the front surface 64. It should be noted that, in the following, the angle formed by the imaginary straight line C1 and the imaginary straight line C2 is also referred to as a "skew angle" or a "skew angle of the magnetic head 58".

The inclination mechanism 80 receives the power from the inclination actuator 80A (see FIG. 4) to rotate the magnetic head 58 around the rotation axis RA on the front surface 64 of the magnetic tape MT. The inclination mechanism 80 rotates, under the control of the control device 54, the magnetic head 58 around the rotation axis RA on the front surface 64 of the magnetic tape MT to change the direction of the inclination of the imaginary straight line C1 with respect to the imaginary straight line C2 (that is, azimuth) and the inclined angle.

By changing the direction of the inclination of the imaginary straight line C1 with respect to the imaginary straight line C2 and the inclined angle, that is, the skew angle in accordance with the temperature, the humidity, the tension at which the magnetic tape MT is wound around the reel, the pressure, the temporal deterioration, and the like, or expansion and contraction of the magnetic tape MT in the width direction WD due to these, the position of the servo reading element SR with respect to the servo pattern 82 is held at the predetermined position determined in design. In this case, the on-track is realized. The on-track refers to a state in which the data read/write element DRW is positioned on a designated track among a plurality of tracks that are present in the data band DB (that is, a state in which the position of the designated track and the position of the data read/write element DRW match in the width direction WD).

By the way, a creep phenomenon is considered as a main factor of the TDS (that is, a main factor of a width change of the magnetic tape MT). For example, the creep phenomenon refers to a phenomenon in which the deformation of the magnetic tape MT (for example, the deformation of the magnetic tape MT in the width direction WD) is increased with time due to the influence of the environment continuously acting on the magnetic tape MT.

A creep amount, that is, a deformation amount of the magnetic tape MT in the width direction WD (hereinafter, also referred to as a "width deformation amount") is increased or decreased in accordance with the temperature and the humidity of the environment in which the magnetic tape MT is stored. Here, a first example of the environment is a space filled with ordinary air (that is, air containing oxygen and nitrogen under a certain pressure on the earth, so-called atmosphere) as a gas containing moisture. A second example of the environment is a space filled with a gas containing a component that is the same as or different from that of the atmosphere (for example, a space in which a gas, such as nitrogen and/or argon, is additionally sealed). In addition, the pressure of the gas in the environment in which the magnetic tape MT is stored may be any pressure as long as the magnetic tape MT is not damaged by the pressure.

The width deformation amount in an environment generally referred to as high temperature and high humidity tends to be larger than in an environment generally referred to as normal temperature and normal humidity. The temperature and the humidity can fluctuate due to the influence of day and night, the season, and the like. Then, the width deformation amount fluctuates due to fluctuations of the temperature and the humidity. This fact is known qualitatively, but the extent of its quantitative influence is not known. Therefore, at present, the management of the magnetic tape MT in which the influences of the fluctuations of the temperature and the humidity are reflected in the fluctuation of the width deformation amount is not sufficiently performed.

The creep phenomenon depends on the temperature and the humidity. Therefore, as a method of managing the width deformation amount of the magnetic tape MT, a method of monitoring both the temperature and the humidity to manage the width deformation amount based on the monitoring result can be considered. However, monitoring two parameters of the temperature and the humidity to manage the width deformation amount in consideration of the influence of each parameter on the width deformation amount takes time and effort as compared with a case in which the width deformation amount is managed in consideration of the influence of one parameter of the temperature or the humidity on the width deformation amount. In addition, in a case in which only one parameter of the temperature or the humidity is monitored, it is possible to reduce the time and effort as compared with monitoring two parameters, but the accuracy of managing the width deformation amount is decreased.

In view of such circumstances, as a result of diligent studies by the present inventors, it has been found that there is a dependency between the creep phenomenon and a specific enthalpy. Since the specific enthalpy is one parameter, handling is easier than two parameters of the temperature and the humidity. Therefore, managing the width deformation amount using the specific enthalpy is more efficient than managing the width deformation amount using two parameters of the temperature and the humidity. In addition, elements of the temperature and the humidity are included in the specific enthalpy. Therefore, managing the width deformation amount using the specific enthalpy is more accurate than managing the width deformation amount in consideration of the influence of one parameter of the temperature or the humidity on the width deformation amount. Therefore, in the magnetic tape system 10 according to the present embodiment, management processing on the magnetic tape MT is performed in accordance with the specific enthalpy in the environment in which the magnetic tape MT is stored. In the following, a specific description will be made.

Figure 8:
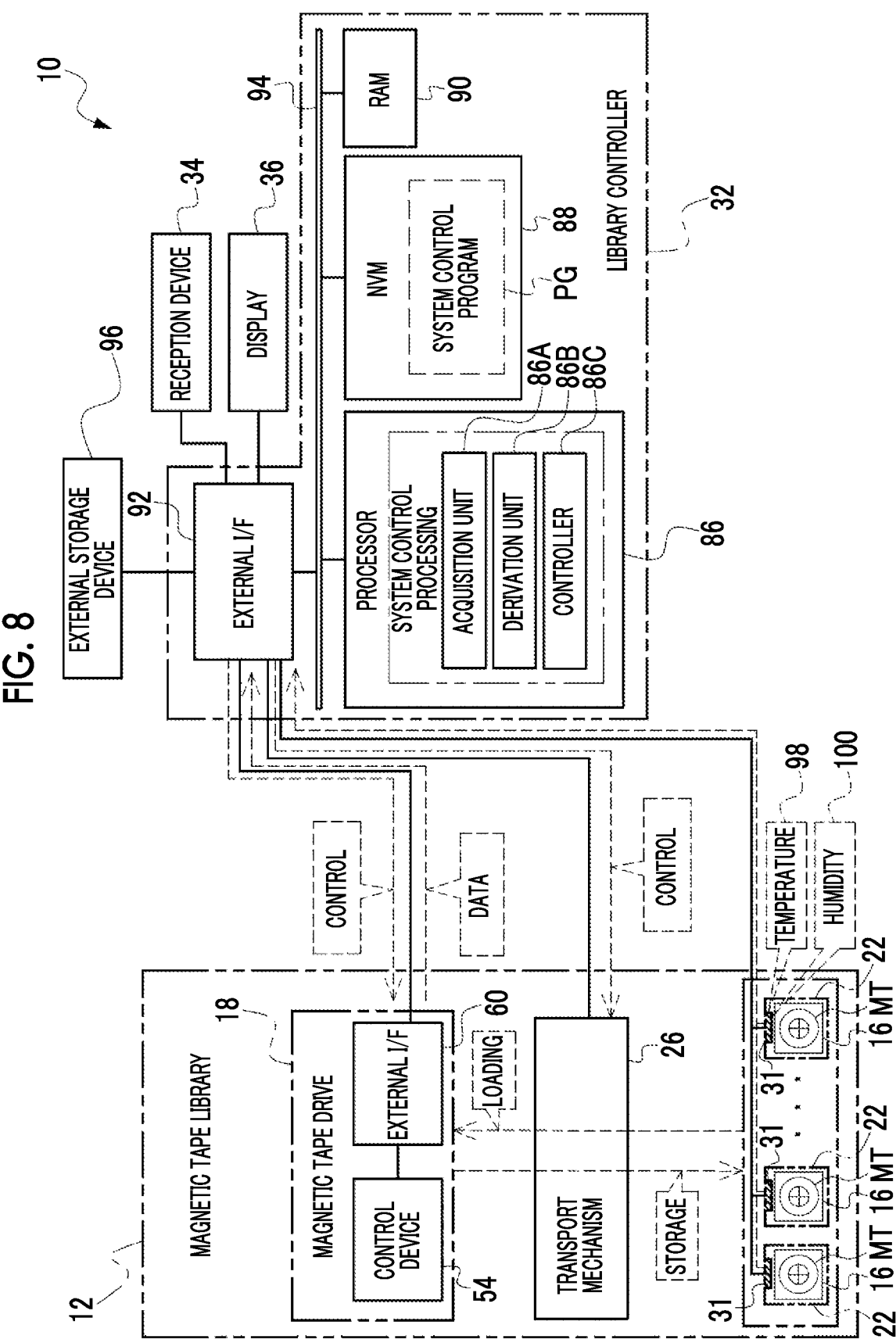
FIG. 8 is a conceptual diagram showing an example of a configuration of a magnetic tape library and a configuration of a library controller.

As shown in FIG. 8 as an example, the library controller 32 comprises a processor 86, an NVM 88, a RAM 90, and an external I/F 92. The processor 86, the NVM 88, the RAM 90, and the external I/F 92 are connected to a bus 94. In the present embodiment, the processor 86 is an example of a "processor" according to the technology of the present disclosure. In addition, in the present embodiment, the library controller 32 is an example of a "magnetic tape management device" and a "computer" according to the technology of the present disclosure.

The processor 86 controls the entire magnetic tape system 10. Examples of the processor 86 include one or more CPUs. The NVM 88 is a non-transitory storage medium, and stores various parameters and various programs. For example, the NVM 88 is an EEPROM. It should be noted that this is merely an example, and another type of non-volatile memory may be used. In addition, the RAM 90 transitorily stores various pieces of information, and is used as a work memory.

The external I/F 92 is connected to the transport mechanism 26. The processor 86 controls the transport mechanism 26 via the external I/F 92. The transport mechanism 26 moves the horizontally movable robot 26C (see FIG. 1) and the vertically movable robot 26E (see FIG. 1) under the control of the processor 86. As a result, a loading operation by the transport mechanism 26 and an accommodation operation by the transport mechanism 26 are selectively performed. The loading operation refers to an operation of taking out the magnetic tape cartridge 16 from the cartridge accommodation cell 22 designated by the processor 86 and loading the taken out magnetic tape cartridge 16 into the magnetic tape drive 18 designated by the processor 86. The accommodation operation refers to an operation of taking out the magnetic tape cartridge 16 loaded into the magnetic tape drive 18 from the magnetic tape drive 18 and accommodating the taken out magnetic tape cartridge 16 in the original cartridge accommodation cell 22. In a case in which the loading operation ends or the accommodation operation ends, the transport mechanism 26 returns to a home position in response to an instruction from the processor 86.

The external I/F 92 is connected to the external I/F 60 of the magnetic tape drive 18. The processor 86 of the library controller 32 controls the magnetic tape drive 18 via the external I/F 92. As a result, the magnetic tape drive 18 reads the first data 84 from the magnetic tape MT, records the first data 84 in the magnetic tape MT, or performs the read/write for the cartridge memory 48. The processor 86 acquires various data including the first data 84 (see FIGS. 5 to 7) from the control device 54 of the magnetic tape drive 18 via the external I/F 92.

The external I/F 92 is connected to a plurality of environment sensors 31 (for example, all the environment sensors 31 in the magnetic tape library 12 or a plurality of environment sensors 31 designated by the user 38 or the like). The processor 86 of the library controller 32 acquires a temperature 98 and humidity 100 measured by each environment sensor 31 via the external I/F 92.

The external I/F 92 is connected to an external storage device 96. The external storage device 96 is a storage device installed outside the library controller 32. Examples of the external storage device 96 include a non-volatile storage device, such as an SSD or an HDD. In addition, the external storage device 96 may be a magnetic tape drive different from the magnetic tape drive 18 (for example, a magnetic tape drive into which the magnetic tape MT other than the magnetic tape MT accommodated in the magnetic tape library 12 is loaded). In addition, the external storage device 96 may be a combination of a plurality of types of storage devices.

A system control program PG is stored in the NVM 88. The system control program PG is an example of a "program" according to the technology of the present disclosure. The processor 86 reads out the system control program PG from the NVM 88, and executes the read out system control program PG on the RAM 90. The processor 86 performs system control processing by operating as an acquisition unit 86A, a derivation unit 86B, and a controller 86C in accordance with the system control program PG executed on the RAM 90. In the following, an example of the system control processing will be described.

Figure 9:
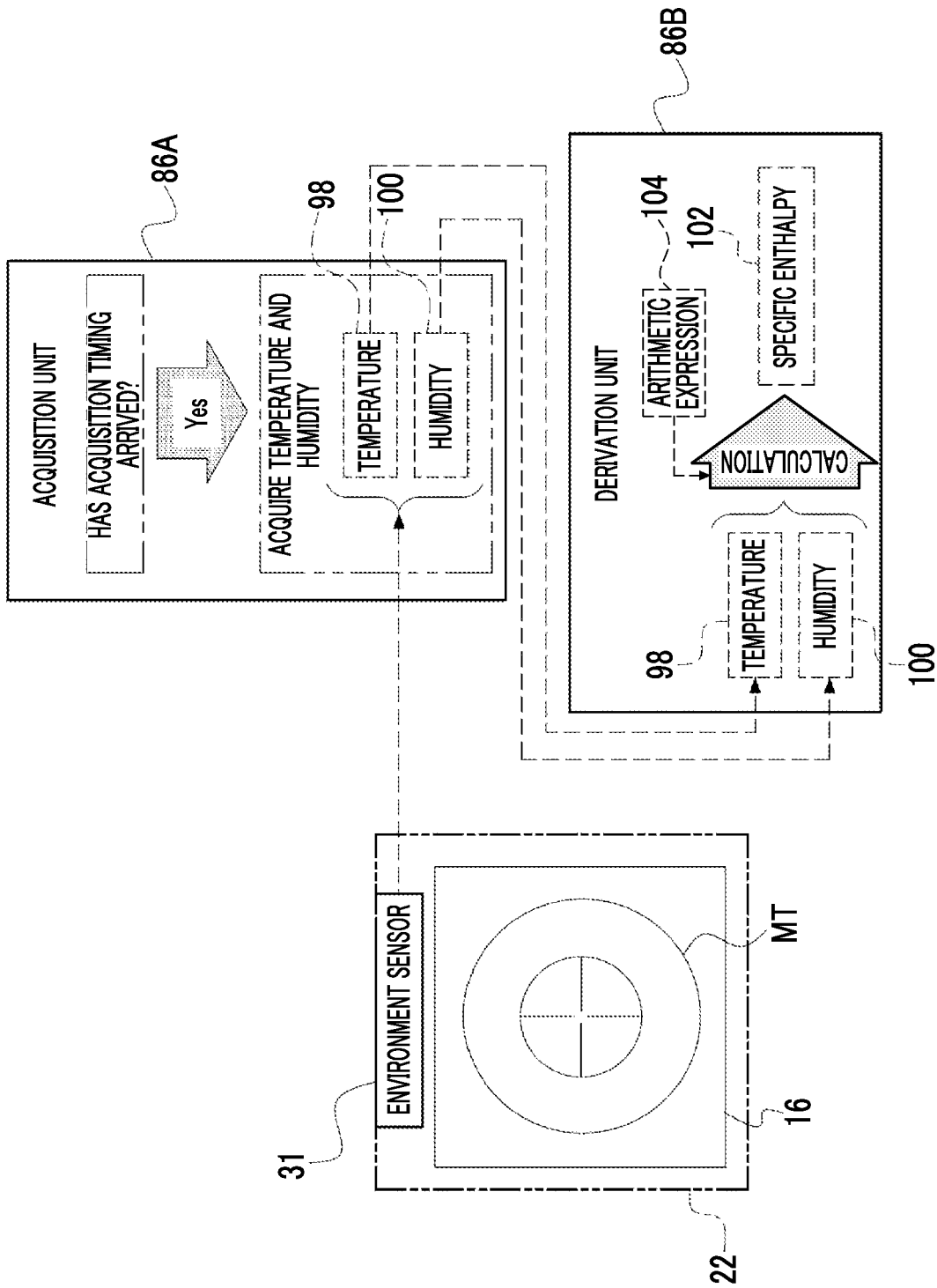
FIG. 9 is a conceptual diagram showing an example of processing contents of an acquisition unit and a derivation unit.

As shown in FIG. 9 as an example, the acquisition unit 86A determines whether or not a timing (hereinafter, referred to as an "acquisition timing") for acquiring the temperature 98 and the humidity 100 from the designated environment sensor 31 has arrived. Examples of the acquisition timing include a timing defined at regular time intervals (for example, 1 hour) designated between several tens of minutes and several hours. It should be noted that the regular time intervals designated between several tens of minutes and several hours are merely an example, and time intervals divided in a unit of seconds, a unit of days, a unit of months, a unit of seasons, or a unit of years may be used.

In a case in which it is determined that the acquisition timing has arrived, the acquisition unit 86A acquires the temperature 98 and the humidity 100 measured by the environment sensor 31 as the temperature and the humidity of the environment (that is, the cartridge accommodation cell 22) in which the magnetic tape MT is stored. It should be noted that the temperature 98 and the humidity 100 are acquired from each of the environment sensors 31 by the acquisition unit 86A. However, in order to facilitate understanding of the technology of the present disclosure, an example will be described here in which attention is focused on one environment sensor 31 and the temperature 98 and the humidity 100 are acquired from one environment sensor 31 by the acquisition unit 86A. In addition, the form example in which the temperature 98 and the humidity 100 are acquired from all the environment sensors 31 by the acquisition unit 86A is merely an example, and the temperature 98 and the humidity 100 may be acquired by the acquisition unit 86A from one or more designated environment sensors 31 among all the environment sensors 31.

The derivation unit 86B derives the specific enthalpy 102 using the temperature 98 and the humidity 100 acquired by the acquisition unit 86A. The derivation of the specific enthalpy 102 is realized by using an arithmetic expression or a table. In the present embodiment, the specific enthalpy 102 is calculated using the arithmetic expression. In the example shown in FIG. 9, the specific enthalpy 102 is calculated from an arithmetic expression 104 by the derivation unit 86B. For example, the arithmetic expression 104 is Mathematical Expression (1). In Mathematical Expression (1), "H" is the specific enthalpy 102, "Td" is the temperature (for example, a dry-bulb temperature), and "x" is the humidity (for example, absolute humidity). It should be noted that the unit of Td is "° C.", the unit of humidity is "kg/kg (D.A)", and the unit of H is "kJ/kg (D.A)". Here, the form example is described in which the specific enthalpy 102 is obtained using Mathematical Expression (1), but this is merely an example. For example, the specific enthalpy 102 may be obtained from a measurement value of the dry-bulb temperature and a measurement value of the wet-bulb temperature using a psychrometric diagram.

$$H=1.006Td+(1.86Td+2501)x \tag{1}$$

Figure 10:
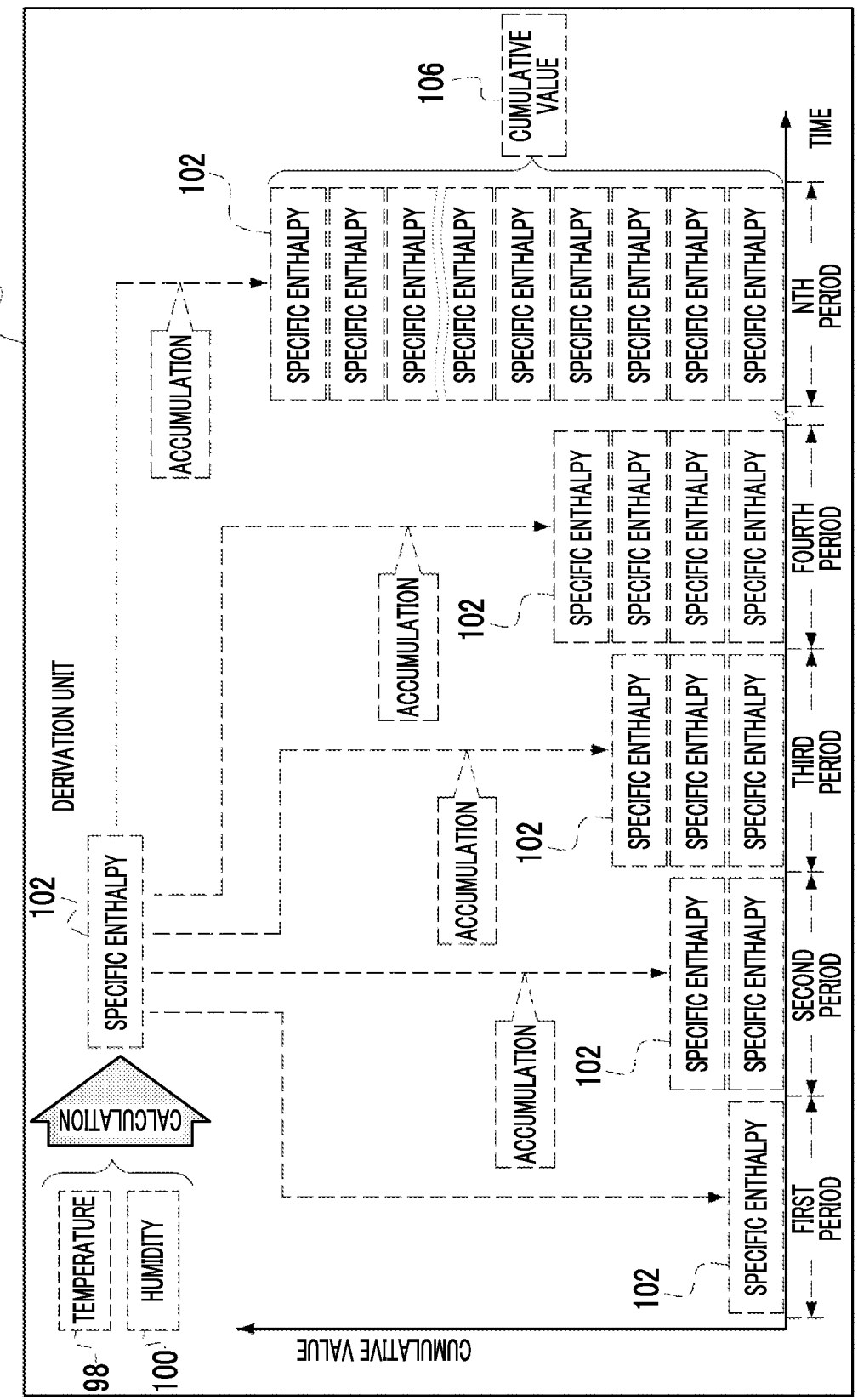
FIG. 10 is a conceptual diagram showing an example of the processing content of the derivation unit.

As shown in FIG. 10 as an example, the derivation unit 86B calculates the specific enthalpy 102 for each of a plurality of periods, and derives a statistic value of the specific enthalpy 102 calculated for each of the plurality of periods. In the example shown in FIG. 10, a cumulative value 106 of the specific enthalpy 102 is shown as an example of the statistic value of the specific enthalpy 102. The plurality of periods are determined at regular time intervals.

The regular time intervals are time intervals (for example, 1 hour) divided by the acquisition timing (see FIG. 9) used by the acquisition unit 86A. The derivation unit 86B calculates the specific enthalpy 102 for each of the plurality of periods, and calculates the cumulative value 106 by accumulating the latest calculated specific enthalpy 102 each time the specific enthalpy 102 is calculated. In the example shown in FIG. 10, the cumulative value 106 up to an Nth period in a case in which N is a natural number of 1 or more is shown, and the specific enthalpy 102 is accumulated after a second period.

Figure 11:
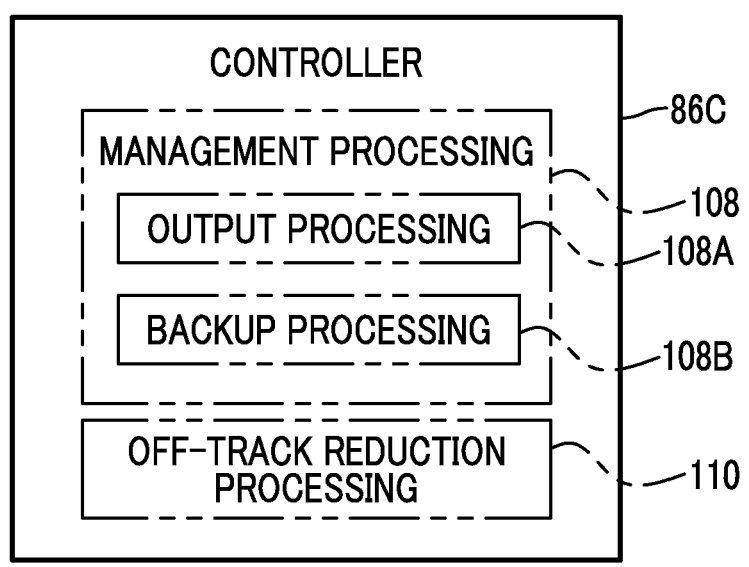
FIG. 11 is a conceptual diagram showing an example of a processing content performed by a controller.

As shown in FIG. 11 as an example, the controller 86C performs management processing 108 and off-track reduction processing 110. The management processing 108 is processing of managing the magnetic tape MT in accordance with the specific enthalpy 102 (see FIGS. 9 and 10). In the present embodiment, the management processing 108 is performed as processing in accordance with the cumulative value 106 (see FIG. 10) of the specific enthalpy 102. The off-track reduction processing 110 is processing of reducing the reproduction failure and/or the off-track with respect to the magnetic tape MT. In the present embodiment, the off-track reduction processing 110 is performed as processing in accordance with the cumulative value 106 (see FIG. 10) of the specific enthalpy 102.

Figure 12:
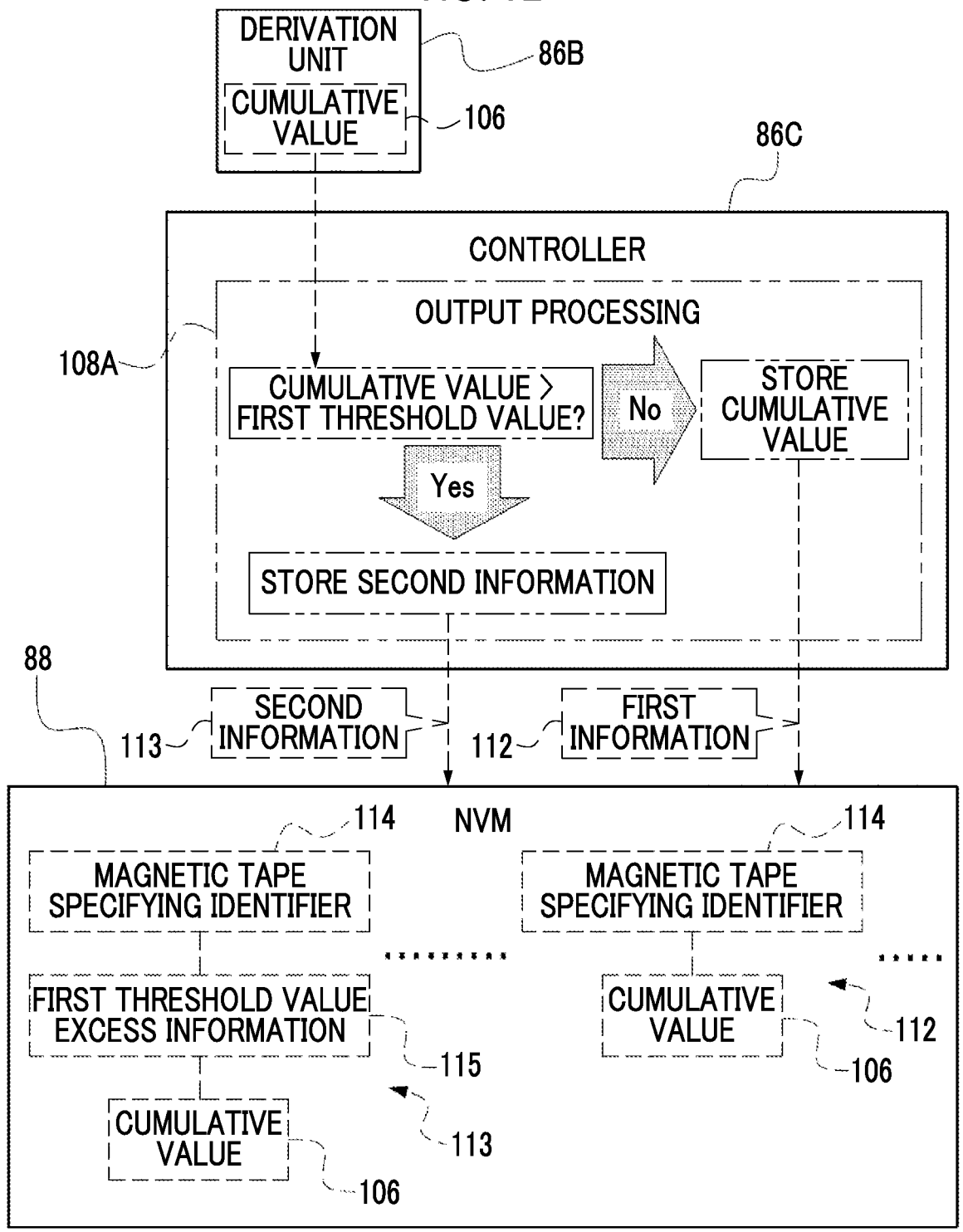
FIG. 12 is a conceptual diagram showing an example of a processing content of output processing performed by the controller.
Figure 13:
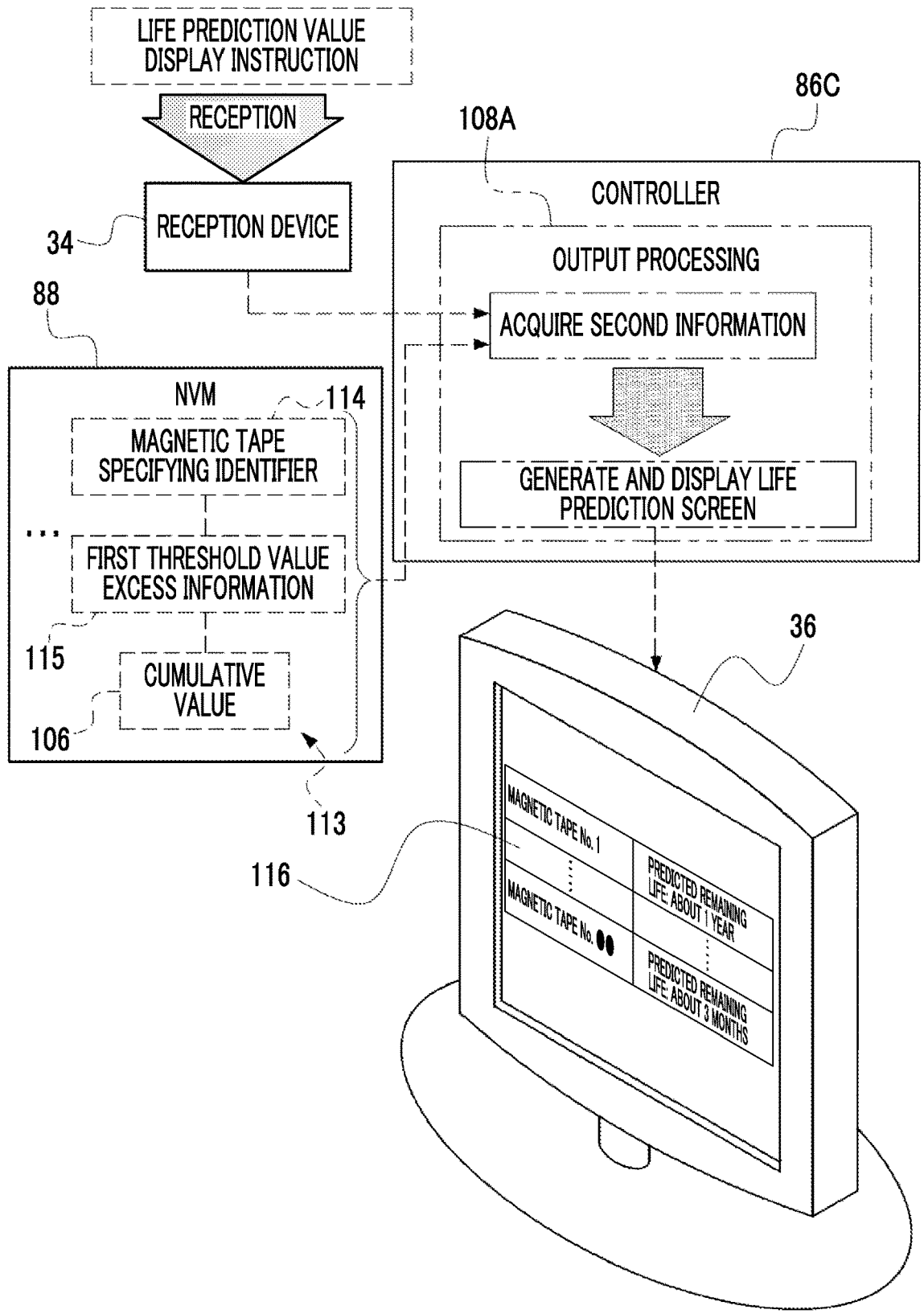
FIG. 13 is a conceptual diagram showing an example of the processing content of the output processing performed by the controller.
Figure 14:
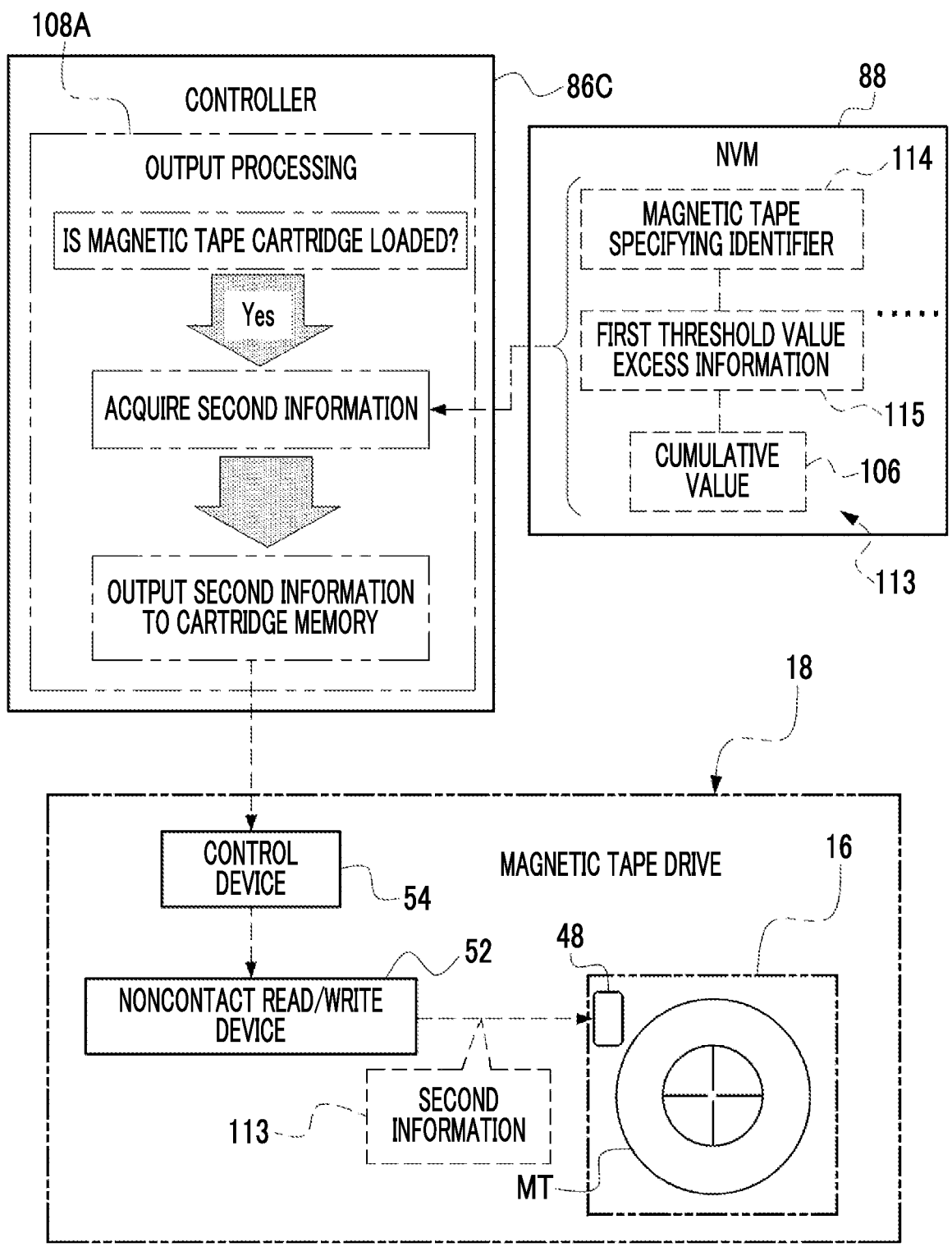
FIG. 14 is a conceptual diagram showing an example of the processing content of the output processing performed by the controller.
Figure 15:
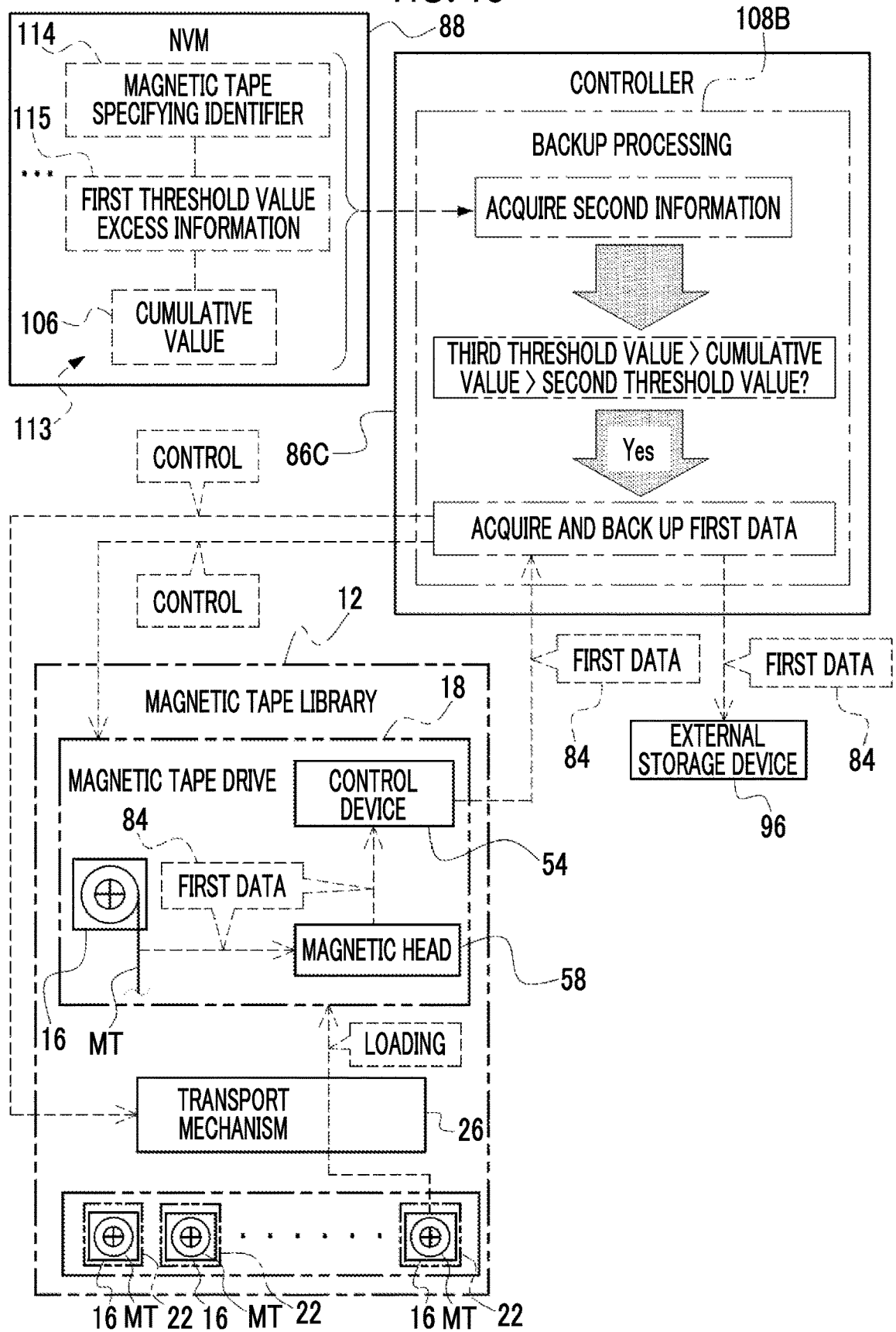
FIG. 15 is a conceptual diagram showing an example of a processing content of backup processing performed by the controller.

The management processing 108 includes output processing 108A and backup processing 108B. In the present embodiment, the management processing 108 is an example of "management processing" according to the technology of the present disclosure. In addition, in the present embodiment, the output processing 108A is an example of "first output processing" and "second output processing" according to the technology of the present disclosure. In addition, in the present embodiment, the backup processing 108B is an example of "backup processing" according to the technology of the present disclosure. In the following, an example of the processing content of each of the management processing 108 and the off-track reduction processing 110 will be described. FIGS. 12 to 14 show an example of the processing content of the output processing 108A included in the management processing 108. FIG. 15 shows an example of the processing content of the backup processing 108B included in the management processing 108. FIG. 16 shows an example of the processing content of the off-track reduction processing 110.

As shown in FIG. 12 as an example, the controller 86C acquires the latest cumulative value 106 calculated by the derivation unit 86B, and determines whether or not the latest cumulative value 106 exceeds a first threshold value.

The first threshold value is a value determined in accordance with the width deformation amount of the magnetic tape MT. For example, the first threshold value is a value derived in advance by a test with an actual machine and/or a computer simulation as the cumulative value 106 corresponding to an upper limit value of the width deformation amount in which the reproduction failure and/or the off-track does not occur. In addition, the first threshold value may be a fixed value or may be a variable value that is changed in response to the instruction received by the reception device 34 and/or various conditions given to the magnetic tape system 10.

The controller 86C selectively outputs first information 112 and second information 113 in accordance with a result of determining whether or not the latest cumulative value 106 exceeds the first threshold value. That is, the controller 86C outputs the first information 112 in a case in which the latest cumulative value 106 does not exceed the first threshold value, and outputs the second information 113 in a case in which the latest cumulative value 106 exceeds the first threshold value.

For example, an output destination of the first information 112 and the second information 113 is NVM 88. That is, the first information 112 and the second information 113 are selectively stored in the NVM 88 by the controller 86C. Here, the NVM 88 is shown as an example of the output destination of the first information 112 and the second information 113, but this is merely an example, and the output destination of the first information 112 and/or the second information 113 may be the external storage device 96, may be the display 36, or may be other devices. In the present embodiment, a storage medium, such as the NVM 88 and the external storage device 96, in which the result of performing the management processing 108 (here, the output processing 108A as an example) by the controller 86C is stored is an example of a "first storage medium" and a "second storage medium" according to the technology of the present disclosure.

The first information 112 is information in which the latest cumulative value 106 and the magnetic tape specifying identifier 114 are associated with each other. The second information 113 is information in which the latest cumulative value 106, the magnetic tape specifying identifier 114, and first threshold value excess information 115 are associated with each other.

The magnetic tape specifying identifier 114 refers to an identifier for specifying the magnetic tape MT. The magnetic tape specifying identifier 114 associated with the cumulative value 106 is an identifier for specifying the magnetic tape MT corresponding to the environment sensor 31 that measures the temperature 98 and the humidity 100 which are used in the calculation of the latest specific enthalpy 101. The magnetic tape MT corresponding to the environment sensor 31 refers to the magnetic tape MT included in the magnetic tape cartridge 16 accommodated in the cartridge accommodation cell 22 in which the environment sensor 31 is installed. In the present embodiment, the magnetic tape cartridge 16 accommodated in the cartridge accommodation cell 22 is determined for each cartridge accommodation cell 22, and the cartridge accommodation cell 22 and the magnetic tape cartridge 16 are associated with each other on a one-to-one basis. The correspondence means that the cartridge accommodation cell 22 and the magnetic tape MT accommodated in the magnetic tape cartridge 16 are associated with each other on a one-to-one basis. In the present embodiment, the magnetic tape specifying identifier 114 is applied for each cartridge accommodation cell 22. In this case, for example, the magnetic tape specifying identifier 114, which is applied to the cartridge accommodation cell 22 in which the environment sensor 31 that measures the temperature 98 and the humidity 100 is installed, is acquired by the acquisition unit 86A or the derivation unit 86B at the timing at which the temperature 98 and the humidity 100 are acquired by the acquisition unit 86A.

The first threshold value excess information 115 is information for specifying that the latest cumulative value 106 exceeds the first threshold value. It should be noted that, in the present embodiment, the second information 113 itself, the magnetic tape specifying identifier 114 included in the second information 113, the first threshold value excess information 115, and/or the cumulative value 106 is an example of "information on the statistic value" according to the technology of the present disclosure.

In a state in which the second information 113 is stored in the NVM 88, as shown in FIG. 13 as an example, in a case in which a life prediction value display instruction is received by the reception device 34, the controller 86C acquires the second information 113 from the NVM 88. Here, the life prediction value display instruction refers to an instruction to display a prediction value of a life of the magnetic tape MT specified by the magnetic tape specifying identifier 114 included in the second information 113 in the NVM 88 on the display 36.

The controller 86C generates a life prediction screen 116 based on the second information 113 acquired from the NVM 88, and displays the generated life prediction screen 116 on the display 36. The life prediction screen 116 is a screen on which the magnetic tape specifying identifier 114 included in the second information 113 and a remaining life predicted for the magnetic tape MT specified from the magnetic tape specifying identifier 114 (hereinafter, referred to as "predicted remaining life") are associated with each other on a one-to-one basis. The predicted remaining life is derived by the controller 86C from an arithmetic expression or a table. In the present embodiment, the predicted remaining life is calculated by the controller 86C from an arithmetic expression in which the cumulative value 106 is an independent variable and the predicted remaining life corresponding to the cumulative value 106 is a dependent variable. The predicted remaining life corresponding to the cumulative value 106 is a life predicted from the cumulative value 106 as the remaining life of the magnetic tape MT. For example, examples of the predicted remaining life corresponding to the cumulative value 106 include a life derived in advance by a test with an actual machine using the cumulative value 106 and/or a computer simulation using the cumulative value 106.

In a state in which the second information 113 is stored in the NVM 88, as shown in FIG. 14 as an example, the controller 86C determines whether or not the magnetic tape cartridge 16 is loaded into the magnetic tape drive 18. In a case in which the controller 86C determines that the magnetic tape cartridge 16 is loaded into the magnetic tape drive 18, the controller 86C acquires the second information 113 from the NVM 88.

Then, the controller 86C outputs the second information 113 acquired from the NVM 88 to the cartridge memory 48 of the magnetic tape drive 18. That is, the controller 86C controls the noncontact read/write device 52 via the control device 54 of the magnetic tape drive 18 to store the second information 113 acquired from the NVM 88 in the cartridge memory 48 of the magnetic tape drive 18 as a part of the management information 50 (see FIG. 2). In other words, the noncontact read/write device 52 stores the second information 113 acquired from the NVM 88 by the controller 86C in the cartridge memory 48 in response to an instruction from the controller 86C. Similarly to the NVM 88 and the external storage device 96, the cartridge memory 48 is an example of a "first storage medium" and a "second storage medium" according to the technology of the present disclosure.

As shown in FIG. 15 as an example, in a case in which the backup processing 108B is performed by the controller 86C, the controller 86C first acquires the latest second information 113 from the NVM 88. The controller 86C determines whether or not the cumulative value 106 included in the latest second information 113 acquired from the NVM 88 exceeds a second threshold value and is less than a third threshold value (that is, whether or not a magnitude relationship of "third threshold value>cumulative value 106>second threshold value" is established). The third threshold value is a value larger than the second threshold value. Similarly to the first threshold value, the second threshold value and the third threshold value are values determined in accordance with the width deformation amount of the magnetic tape MT. For example, the second threshold value is a value equal to or larger than the first threshold value. In addition, for example, the third threshold value is a value derived in advance by a test with an actual machine and/or a computer simulation as the cumulative value 106 corresponding to a lower limit value of the width deformation amount in a case in which the life of the magnetic tape MT is reached. The second threshold value and/or the third threshold value may be a fixed value or may be a variable value that is changed in response to the instruction received by the reception device 34 and/or various conditions given to the magnetic tape system 10.

In a case in which the magnitude relationship of "third threshold value>cumulative value 106>second threshold value" is established, the controller 86C controls and operates the transport mechanism 26 to load the magnetic tape cartridge 16, which accommodates the magnetic tape MT specified from the magnetic tape specifying identifier 114 associated with the cumulative value 106 that is a determination target, into the magnetic tape drive 18. The controller 86C controls the magnetic tape drive 18 to cause the magnetic head 58 of the magnetic tape drive 18 to read the first data 84 from the magnetic tape MT in the magnetic tape cartridge 16. The controller 86C acquires the first data 84 read by the magnetic head 58 via the control device 54 of the magnetic tape drive 18. Then, the controller 86C stores the first data 84 acquired from the magnetic tape drive 18 in the external storage device 96 as a medium different from the magnetic tape MT in the magnetic tape drive 18, thereby backing up the first data 84 to the external storage device 96 from the magnetic tape MT in the magnetic tape drive 18.

As shown in FIG. 16 as an example, in a case in which the off-track reduction processing is performed by the controller 86C, the controller 86C first determines whether or not the magnetic tape cartridge 16 is loaded into the magnetic tape drive 18. Next, in a case in which it is determined that the magnetic tape cartridge 16 is loaded into the magnetic tape drive 18, on a condition that a magnetic processing execution instruction is received by the reception device 34, the controller 86C acquires the cumulative value 106 from the latest second information 113 stored in the NVM 88. Here, the magnetic processing execution instruction refers to an instruction to cause the magnetic head 58 to execute the magnetic processing on the front surface 64 of the magnetic tape MT in the magnetic tape cartridge 16 loaded into the magnetic tape drive 18.

Next, the controller 86C adjusts the skew angle and the tension applied to the magnetic tape MT based on the cumulative value 106 acquired from the second information 113. In this case, the controller 86C derives the skew angle and the tension applied to the magnetic tape MT based on the cumulative value 106 acquired from the second information 113. The derivation of the skew angle is performed by using an arithmetic expression or a table. Here, for example, the skew angle is calculated by the controller 86C from a skew angle arithmetic expression in which the cumulative value 106 is an independent variable and the skew angle corresponding to the cumulative value 106 is a dependent variable.

Examples of the skew angle corresponding to the cumulative value 106 include the skew angle derived in advance by a test with an actual machine using the cumulative value 106 and/or a computer simulation using the cumulative value 106 as the skew angle at which the on-track can be realized. In addition, the derivation of the tension applied to the magnetic tape MT is also performed by using an arithmetic expression or a table. Here, for example, the tension is calculated by the controller 86C from a tension arithmetic expression in which the cumulative value 106 is an independent variable and the tension corresponding to the cumulative value 106 is a dependent variable. Examples of the tension corresponding to the cumulative value 106 include the tension derived in advance by a test with an actual machine using the cumulative value 106 and/or a computer simulation using the cumulative value 106 as the tension at which the on-track can be realized.

The controller 86C controls the inclination mechanism 80 via the control device 54 of the magnetic tape drive 18 to adjust a skew angle θ of the magnetic head 58 such that the skew angle θ of the magnetic head 58 is the skew angle calculated from the skew angle arithmetic expression. In addition, the controller 86C controls the sending motor 68 and the winding motor 72 to adjust the tension applied to the magnetic tape MT such that the tension applied to the magnetic tape MT is the tension calculated from the tension arithmetic expression. It should be noted that, in the present embodiment, the library controller 32 including the processor 86 that is operated as the controller 86C that executes the off-track reduction processing shown in FIG. 16 is an example of a "control device that is operated based on the result stored in the second storage medium" according to the technology of the present disclosure. In addition, here, the form example has been described in which both the adjustment of the skew angle and the adjustment of the tension are performed, this is merely an example, and only one of the adjustment of the skew angle or the adjustment of the tension may be performed.

Next, an example of a flow of the system control processing performed by the processor 86 of the library controller 32 will be described with reference to the flowcharts shown in FIGS. 17A and 17B.

Figure 17B:
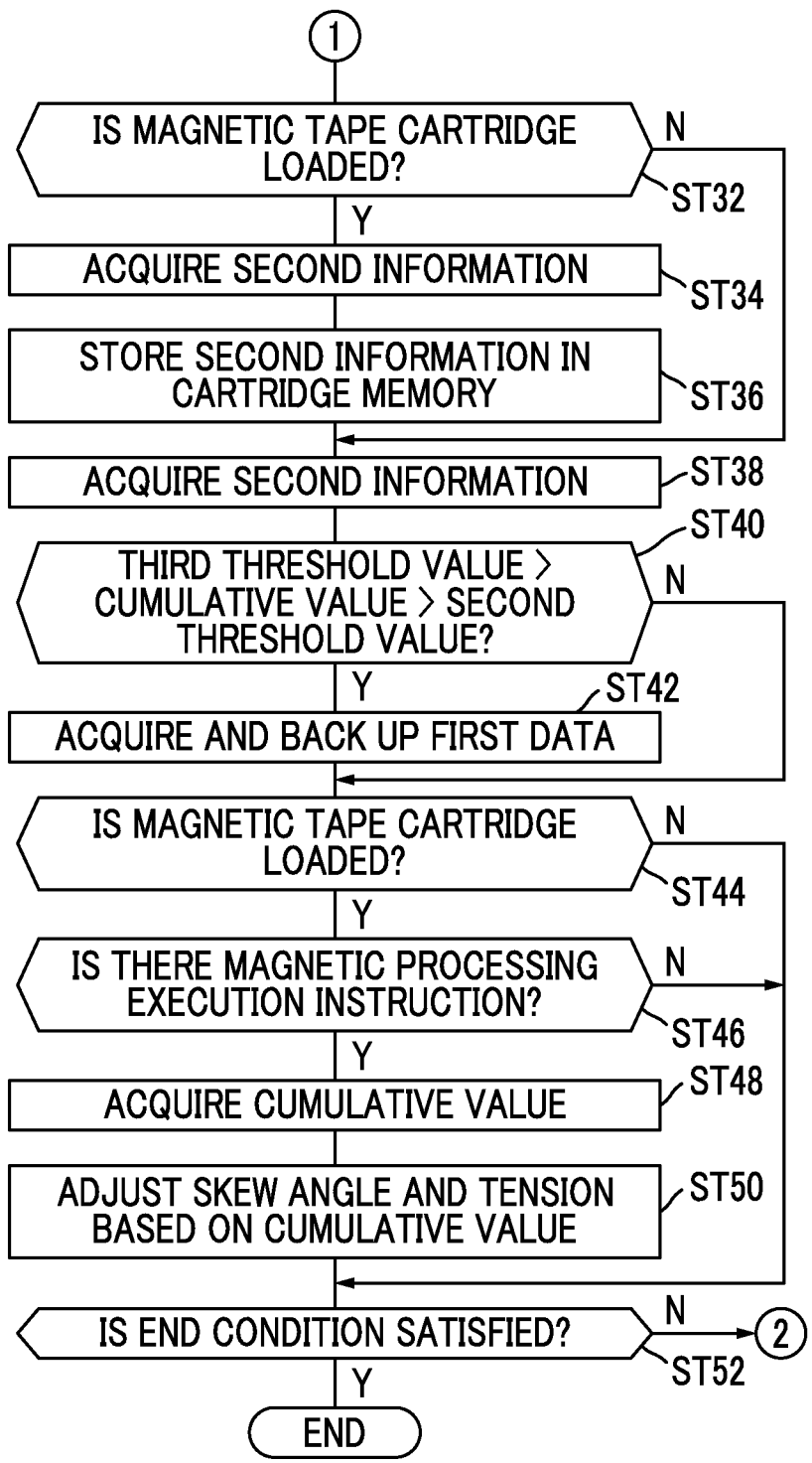
FIG. 17B is a continuation of the flowchart shown in FIG. 17A.

An example of the flow of the system control processing specified from the flowcharts shown in FIGS. 17A and 17B is an example of a "magnetic tape management method" according to the technology of the present disclosure.

In the system control processing shown in FIG. 17A, first, in step ST10, the acquisition unit 86A determines whether or not the acquisition timing has arrived (see FIG. 9). In step ST10, in a case in which the acquisition timing has not arrived, a negative determination is made, and the determination in step ST10 is made again. In step ST10, in a case in which the acquisition timing has arrived, a positive determination is made, and the system control processing proceeds to step ST12.

In step ST12, the acquisition unit 86A acquires the temperature 98 and the humidity 100 measured by the environment sensor 31 (see FIG. 9). After the processing of step ST12 is executed, the system control processing proceeds to step ST14.

In step ST14, the derivation unit 86B calculates the specific enthalpy 102 from the temperature 98 and the humidity 100 acquired in step ST12 by using the arithmetic expression 104 (see FIG. 9). After the processing of step ST14 is executed, the system control processing proceeds to step ST16.

In step ST16, the derivation unit 86B determines whether or not the current time is a period after the second period. In step ST16, in a case in which the current time is not the period after the second period (that is, a case in which the current time is the first period), a negative determination is made, and the system control processing proceeds to step ST10. In step ST16, in a case in which the current time is the period after the second period, a positive determination is made, and the system control processing proceeds to step ST18.

In step ST18, the derivation unit 86B calculates the cumulative value 106 of the specific enthalpy 102 calculated in step ST14 (see FIG. 10). After the processing of step ST18 is executed, the system control processing proceeds to step ST20.

In step ST20, the controller 86C determines whether or not the cumulative value 106 calculated in step ST18 exceeds the first threshold value (see FIG. 12). In step ST20, in a case in which the cumulative value 106 calculated in step ST18 does not exceed the first threshold value, a negative determination is made, and the system control processing proceeds to step ST22. In step ST20, in a case in which the cumulative value 106 calculated in step ST18 exceeds the first threshold value, a positive determination is made, and the system control processing proceeds to step ST24.

In step ST22, the controller 86C generates the first information 112 by associating the cumulative value 106 calculated in step ST18 with the magnetic tape specifying identifier 114, and stores the generated first information 112 in the NVM 88 (see FIG. 12). The magnetic tape specifying identifier 114 associated with the cumulative value 106 is the identifier for specifying the magnetic tape MT included in the magnetic tape cartridge 16 that accommodates the cartridge accommodation cell 22 in which the environment sensor 31 that measures the latest temperature 98 and humidity 100 acquired in step ST12 is installed. After the processing of step ST22 is executed, the system control processing proceeds to step ST10.

In step ST24, the controller 86C generates the second information 113 by associating the cumulative value 106 calculated in step ST18, the magnetic tape specifying identifier 114 (that is, the magnetic tape specifying identifier 114 obtained in the same manner as the magnetic tape specifying identifier 114 used in step ST22), and the first threshold value excess information 115 with each other. Then, the controller 86C stores the generated second information 113 in the NVM 88 (see FIG. 12). After the processing of step ST26 is executed, the system control processing proceeds to step ST26.

In step ST26, the controller 86C determines whether or not the life prediction value display instruction is received by the reception device 34. In step ST26, in a case in which the life prediction value display instruction is not received by the reception device 34, a negative determination is made, and the system control processing proceeds to step ST32 shown in FIG. 17B. In step ST26, in a case in which the life prediction value display instruction is received by the reception device 34, a positive determination is made, and the system control processing proceeds to step ST28.

In step ST28, the controller 86C acquires the second information 113 from the NVM 88 (see FIG. 13). After the processing of step ST28 is executed, the system control processing proceeds to step ST30.

In step ST30, the controller 86C generates the life prediction screen 116 based on the second information 113 acquired in step ST28, and displays the generated life prediction screen 116 on the display 36 (see FIG. 13). After the processing of step ST30 is executed, the system control processing proceeds to step ST32 shown in FIG. 17B.

In step ST32 shown in FIG. 17B, the controller 86C determines whether or not the magnetic tape cartridge 16 is loaded into the magnetic tape drive 18 (see FIG. 14). In step ST32, in a case in which the magnetic tape cartridge 16 is not loaded into the magnetic tape drive 18, a negative determination is made, and the system control processing proceeds to step ST38. In step ST32, in a case in which the magnetic tape cartridge 16 is loaded into the magnetic tape drive 18, a positive determination is made, and the system control processing proceeds to step ST34.

In step ST34, the controller 86C acquires the second information 113 from the NVM 88 (see FIG. 14). After the processing of step ST34 is executed, the system control processing proceeds to step ST36.

In step ST36, the controller 86C controls the noncontact read/write device 52 via the control device 54 of the magnetic tape drive 18 to store the second information 113 acquired in step ST34 in the cartridge memory 48 (see FIG. 14). After the processing of step ST36 is executed, the system control processing proceeds to step ST38.

In step ST38, the controller 86C acquires the latest second information 113 from the NVM 88 (see FIG. 15). After the processing of step ST38 is executed, the system control processing proceeds to step ST40.

In step ST40, the controller 86C determines whether or not the cumulative value 106 included in the latest second information 113 acquired in step ST38 exceeds the second threshold value and is less than the third threshold value (see FIG. 15). In step ST40, in a case in which the cumulative value 106 included in the latest second information 113 acquired in step ST38 exceeds the second threshold value and is not less than the third threshold value, a negative determination is made, and the system control processing proceeds to step ST44. In step ST40, in a case in which the cumulative value 106 included in the latest second information 113 acquired in step ST38 exceeds the second threshold value and is less than the third threshold value, a positive determination is made, and the system control processing proceeds to step ST42.

In step ST42, the controller 86C controls the transport mechanism 26 to load the magnetic tape cartridge 16, which accommodates the magnetic tape MT specified from the magnetic tape specifying identifier 114 associated with the cumulative value 106 that is the determination target in step ST40, into the magnetic tape drive 18 (see FIG. 15). In addition, the controller 86C controls the magnetic tape drive 18 to cause the magnetic head 58 of the magnetic tape drive 18 to read the first data 84 from the magnetic tape MT in the magnetic tape cartridge 16 (see FIG. 15). In addition, the controller 86C acquires the first data 84 read by the magnetic head 58 via the control device 54 of the magnetic tape drive 18 (see FIG. 15). Then, the controller 86C stores the first data 84 acquired from the magnetic tape drive 18 in the external storage device 96, thereby backing up the first data 84 to the external storage device 96 from the magnetic tape MT in the magnetic tape drive 18 (see FIG. 15). After the processing of step ST42 is executed, the system control processing proceeds to step ST44.

In step ST44, the controller 86C determines whether or not the magnetic tape cartridge 16 is loaded into the magnetic tape drive 18 (see FIG. 16). In step ST44, in a case in which the magnetic tape cartridge 16 is not loaded into the magnetic tape drive 18, a negative determination is made, and the system control processing proceeds to step ST52. In step ST44, in a case in which the magnetic tape cartridge 16 is loaded into the magnetic tape drive 18, a positive determination is made, and the system control processing proceeds to step ST46.

In step ST46, the controller 86C determines whether or not the magnetic processing execution instruction is received by the reception device 34. In step ST46, in a case in which the magnetic processing execution instruction is not received by the reception device 34, a negative determination is made, and the system control processing proceeds to step ST52. In step ST46, in a case in which the magnetic processing execution instruction is received by the reception device 34, a positive determination is made, and the system control processing proceeds to step ST48.

In step ST48, the controller 86C acquires the cumulative value 106 from the latest second information 113 stored in the NVM 88 (see FIG. 16). After the processing of step ST48 is executed, the system control processing proceeds to step ST50.

In step ST50, the controller 86C calculates the skew angle from the skew angle arithmetic expression based on the cumulative value 106 acquired in step ST48. Then, the controller 86C controls the inclination mechanism 80 via the control device 54 of the magnetic tape drive 18 to adjust the skew angle $\theta$ of the magnetic head 58 such that the skew angle $\theta$ of the magnetic head 58 is the skew angle calculated from the skew angle arithmetic expression (see FIG. 16). In addition, the controller 86C calculates the tension from the tension arithmetic expression based on the cumulative value 106 acquired in step ST48. Then, the controller 86C controls the sending motor 68 and the winding motor 72 via the control device 54 of the magnetic tape drive 18 to adjust the tension applied to the magnetic tape MT such that the tension applied to the magnetic tape MT is the tension calculated from the tension arithmetic expression. After the processing of step ST50 is executed, the system control processing proceeds to step ST52.

In step ST52, the controller 86C determines whether or not a condition for end the system control processing (hereinafter, referred to as an "end condition") is satisfied. An example of the end condition is a condition in which an instruction to end the system control processing is received by the reception device 34. In step ST52, in a case where the end condition is not satisfied, a negative determination is made, and the system control processing proceeds to step ST10 shown in FIG. 17A. In step ST52, in a case in which the end condition is satisfied, a positive determination is made, and the system control processing ends.

As described above, in the magnetic tape system 10, the temperature 98 and the humidity 100 of the environment in which the magnetic tape MT is stored are acquired, and the specific enthalpy 102 using the temperature 98 and the humidity 100 is derived. The creep phenomenon considered as the main factor of the width change of the magnetic tape MT is dependent on the specific enthalpy 102. Therefore, in the magnetic tape system 10, the management processing 108 is performed on the magnetic tape MT in accordance with the specific enthalpy 102. That is, as the management for the magnetic tape MT, the management is performed in which the influence of the specific enthalpy 102 is reflected in the fluctuation of the width deformation amount of the magnetic tape MT. Therefore, a quality of the magnetic tape MT (for example, a quality due to the width deformation amount of the magnetic tape MT) can be managed. In addition, in the magnetic tape system 10, the management processing 108 is performed using only one parameter of the specific enthalpy 102. Therefore, the width deformation amount of the magnetic tape MT can be easily managed as compared with a case in which the width deformation amount of the magnetic tape MT is managed in consideration of the influences of the temperature 98 and the humidity 100 on the width deformation amount of the magnetic tape MT while monitoring both the temperature 98 and the humidity 100.

In addition, in the magnetic tape system 10, the management processing 108 is performed as the processing corresponding to the cumulative value 106 of the specific enthalpy 102. The cumulative value 106 represents a tendency of a temporal change of the specific enthalpy 102. Therefore, as the management for the quality of the magnetic tape MT (for example, the quality due to the width deformation amount of the magnetic tape MT), the management corresponding to the tendency (here, as an example, the cumulative value 106 of the specific enthalpy 102) of the temporal change of the specific enthalpy 102 can be realized.

In addition, in the magnetic tape system 10, the specific enthalpy 102 is calculated for each of the plurality of periods (for example, a period divided in a unit of 1 hour). Then, the management processing 108 is performed as the processing corresponding to the cumulative value 106 of the specific enthalpy 102 calculated for each of the plurality of periods. The cumulative value 106 represents the tendency of the temporal change of the specific enthalpy 102 over the plurality of periods. Therefore, as the management for the quality of the magnetic tape MT (for example, the quality due to the width deformation amount of the magnetic tape MT), the management corresponding to the tendency of the temporal change of the specific enthalpy 102 over the plurality of periods can be realized.

In addition, in the magnetic tape system 10, the plurality of periods in which the specific enthalpy 102 is calculated are determined at regular time intervals (for example, 1 hour interval). Therefore, as the management for the quality of the magnetic tape (for example, the quality due to the width deformation amount of the magnetic tape MT), the management corresponding to the tendency of the temporal change of the specific enthalpy over the plurality of periods determined at regular time intervals can be realized.

In addition, in the magnetic tape system 10, the second information 113 is output in a case in which the cumulative value 106 of the specific enthalpy 102 exceeds the first threshold value. The first threshold value excess information 115 is included in the second information 113. The first threshold value excess information 115 is information for specifying that the latest cumulative value 106 exceeds the first threshold value. Therefore, a timing at which the cumulative value 106 of the specific enthalpy 102 exceeds the first threshold value can be managed.

In addition, in the magnetic tape system 10, the first threshold value to be compared with the latest cumulative value 106 of the specific enthalpy 102 is determined in accordance with the width deformation amount of the magnetic tape MT. Therefore, the width deformation amount of the magnetic tape MT can be managed with high accuracy as compared with a case in which the first threshold value is determined depending only on the empirical rule or the intuition.

In addition, in the magnetic tape system 10, the first data 84 is recorded in the data band DB of the magnetic tape MT. However, there is a concern that the first data 84 may not be reproducible due to the decrease in the quality of the magnetic tape MT (for example, the quality due to the width deformation amount of the magnetic tape MT). Therefore, in the magnetic tape system 10, the first data 84 is backed up to the external storage device 96, which is a medium different from the magnetic tape MT, by performing the backup processing 108B. Therefore, it is possible to avoid a situation in which the first data 84 recorded in the data band DB of the magnetic tape MT is not reproduced.

In addition, in the magnetic tape system 10, the backup processing 108B is performed before the latest cumulative value 106 of the specific enthalpy 102 exceeds the second threshold value and reaches the third threshold value. Therefore, the first data 84 can be backed up to the external storage device 96, which is a medium different from the magnetic tape MT, at an appropriate timing, as compared with a case in which the backup processing 108B is performed regardless of the magnitude of the cumulative value 106 of the specific enthalpy 102.

In addition, in the magnetic tape system 10, the second threshold value and the third threshold value to be compared with the cumulative value 106 of the specific enthalpy 102 are determined in accordance with the width deformation amount of the magnetic tape MT. Therefore, the width deformation amount of the magnetic tape MT can be managed with high accuracy as compared with a case in which the second threshold value and the third threshold value are determined depending only on the empirical rule or the intuition. It should be noted that both the second threshold value and the third threshold value are determined in accordance with the width deformation amount of the magnetic tape MT, but at least the third threshold value out of the second threshold value or the third threshold value need only be determined in accordance with the width deformation amount of the magnetic tape MT.

In addition, in the magnetic tape system 10, the first information 112 and the second information 113 are output. The information on the cumulative value 106 of the specific enthalpy 102 is included in the first information 112 and the second information 113. For example, the cumulative value 106 itself is included in the first information 112, and the cumulative value 106 and the first threshold value excess information 115 are included in the second information 113.

Therefore, the information on the cumulative value 106 of the specific enthalpy 102 can be managed by outputting the first information 112 and the second information 113.

In addition, in the magnetic tape system 10, the magnetic tape cartridge 16 that accommodates the magnetic tape MT is stored in the environment of the cartridge accommodation cell 22 of the magnetic tape library 12. In the magnetic tape system 10, the temperature 98 and the humidity 100 of the cartridge accommodation cell 22 which is the environment in which the magnetic tape cartridge 16 is stored are acquired, and the specific enthalpy 102 using the temperature 98 and the humidity 100 is derived. The creep phenomenon considered as the main factor of the width change of the magnetic tape MT is dependent on the specific enthalpy 102. Therefore, in the magnetic tape system 10, the management processing 108 is performed on the magnetic tape MT accommodated in the magnetic tape cartridge 16 in accordance with the specific enthalpy 102. That is, as the management for the magnetic tape MT, the management is performed in which the influence of the specific enthalpy 102 is reflected in the fluctuation of the width deformation amount of the magnetic tape MT. Therefore, the quality of the magnetic tape MT accommodated in the magnetic tape cartridge 16 (for example, the quality due to the width deformation amount of the magnetic tape MT) can be managed.

In addition, in the magnetic tape system 10, each of the plurality of magnetic tape cartridges 16 is stored in the environment of the cartridge accommodation cell 22 of the magnetic tape library 12. In the magnetic tape system 10, the temperature 98 and the humidity 100 of the plurality of cartridge accommodation cells 22 which are the environments in which the plurality of magnetic tape cartridges 16 are stored are acquired, and the specific enthalpy 102 using the temperature 98 and the humidity 100 is derived. The creep phenomenon considered as the main factor of the width change of the magnetic tape MT is dependent on the specific enthalpy 102. Therefore, in the magnetic tape system 10, the management processing 108 is performed on a plurality of magnetic tapes MT accommodated in the plurality of magnetic tape cartridges 16 in accordance with the specific enthalpy 102.

Therefore, the quality of the plurality of magnetic tapes MT accommodated in the plurality of magnetic tape cartridges 16 (for example, the quality due to the width deformation amount of the plurality of magnetic tapes MT) can be managed.

In addition, in the magnetic tape system 10, the plurality of magnetic tape cartridges 16 are accommodated in the rack 20 to be freely taken in and out. A magnetic tape MT is accommodated in each of the plurality of magnetic tape cartridges 16. The temperature 98 and the humidity 100 in the rack 20 are acquired by the acquisition unit 86A, and the specific enthalpy 102 using the temperature 98 and the humidity 100 is calculated by the derivation unit 86B. Then, the management processing 108 is performed on the magnetic tape MT in accordance with the specific enthalpy 102. Therefore, the quality of the magnetic tape MT accommodated in the rack 20 (for example, the quality due to the width deformation amount of the magnetic tape MT) can be managed.

It should be noted that, in the embodiment described above, the form example has been described in which the cumulative value 106 of the specific enthalpy 102 is calculated by the derivation unit 86B, but this is merely an example. For example, instead of the cumulative value 106, an average value of the specific enthalpy 102 may be applied, a most frequent value of the specific enthalpy 102 may be applied, a median value of the specific enthalpy 102 may be applied, a maximum value of the specific enthalpy 102 may be applied, or a minimum value of the specific enthalpy 102 may be applied, and the statistic value that can represent the tendency of the temporal change of the specific enthalpy 102 need only be used.

In addition, in the embodiment described above, the form example has been described in which the management processing 108 is performed based on the cumulative value 106 of the specific enthalpy 102, but the technology of the present disclosure is not limited to this. For example, the management processing 108 may be performed based on the acquired specific enthalpy 102 for each period each time the specific enthalpy 102 of each of the plurality of periods is acquired.

In addition, in the embodiment described above, for convenience of description, the management processing 108 using the specific enthalpy 102 based on the temperature 98 and the humidity 100 acquired by the acquisition unit 86A from one environment sensor 31 has been described as an example, but the technology of the present disclosure is not limited to this. For example, the temperature 98 and the humidity 100 may be acquired by the acquisition unit 86A in parallel or sequentially from the plurality of environment sensors 31 (for example, the plurality of environment sensors 31 designated by the user 38 or the like or all the environment sensors 31), and the management processing 108 using the specific enthalpy 102 based on the acquired temperature 98 and humidity 100 may be executed by the controller 86C. As a result, the management processing 108 for the plurality of magnetic tapes MT can be performed in parallel or sequentially.

In addition, in the embodiment described above, the form example has been described in which in which the reproduction failure and the off-track are reduced by adjusting the skew angle θ, but the technology of the present disclosure is not limited to this.

For example, instead of the adjustment of the skew angle θ or in addition to the adjustment of the skew angle θ, the tension applied to the magnetic tape MT may be adjusted based on the cumulative value 106 to reduce the reproduction failure and the off-track. The adjustment of the tension applied to the magnetic tape MT is realized by controlling the operation of the sending motor 68 and the operation of the winding motor 72.

In addition, in the embodiment described above, the form example has been described in which the backup processing is performed in a case in which the magnitude relationship of "third threshold value>cumulative value 106>second threshold value" is established, but the technology of the present disclosure is not limited to this. For example, in a case in which a magnitude relationship of "third threshold value>cumulative value 106>second threshold value" is established, instead of the backup processing or together with the backup processing, information indicating that the cumulative value 106 exceeds the second threshold value (for example, an alert indicating the life is reached) may be output by the controller 86C. In this case, it is preferable that the second threshold value is larger than the first threshold value. By setting the second threshold value to the value larger than the first threshold value, the alert of a first stage using the life prediction screen 116 and the alert of a second stage using the information indicating that the cumulative value 106 exceeds the second threshold value can be activated in stages. In this case, for example, the alert of the first stage need only activated in a case in which the magnitude relationship of "second threshold value>cumulative value 106>first threshold value" is established, and the alert of the second stage need only be activated in a case in which the magnitude relationship of "cumulative value 106>second threshold value" is established.

Figure 18:
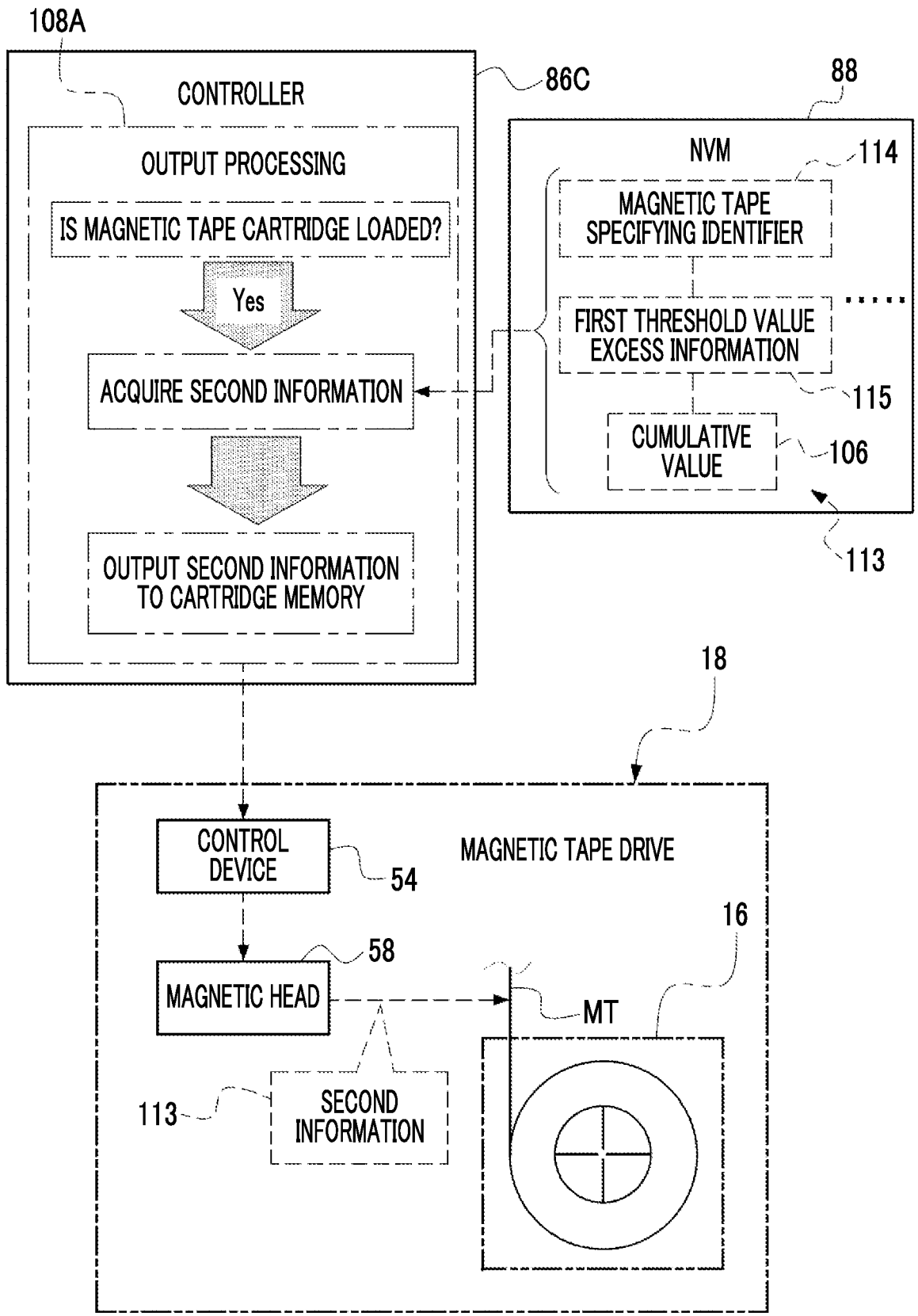
FIG. 18 is a conceptual diagram showing a first modification example of the processing content of the output processing performed by the controller.

It should be noted that, in the embodiment described above, the form example has been described in which the second information 113 is stored in the NVM 88 and the cartridge memory 48 (see FIGS. 12 and 14), but the technology of the present disclosure is not limited to this. For example, as shown in FIG. 18, the controller 86C may control the magnetic head 58 via the control device 54 of the magnetic tape drive 18 to record the second information 113, which is the result of performing the output processing 108A, in the magnetic tape MT. In this case, for example, the second information 113 need only be recorded in a BOT region or an EOT region of the magnetic tape MT. In this way, by recording the second information 113 in the magnetic tape MT, the quality of the magnetic tape MT can be managed by using the second information 113 recorded in the magnetic tape MT. It should be noted that, in the example shown in FIG. 18, the magnetic tape MT is an example of a "first storage medium" and a "second storage medium" according to the technology of the present disclosure.

In addition, the first information 112 (see FIG. 12), which is the result of performing the output processing 108A, may be recorded in the magnetic tape MT. In addition, as the result of performing the backup processing 108B, a part of the first data 84 or information (for example, an address) specifying a destination (for example, the external storage device 96) to which the first data 84 is backed up by performing the backup processing 108B may be recorded in the magnetic tape MT. In addition, these pieces of information may be stored in the NVM 88, may be stored in the external storage device 96, or may be stored in the cartridge memory 48. The information for specifying the destination to which the first data 84 is backed up is merely an example, and various pieces of information obtained by performing the management processing 108 need only be stored in the magnetic tape MT, the NVM 88, the external storage device 96, and/or the cartridge memory 48. As a result, the quality of the magnetic tape MT can be managed by using the information stored in the magnetic tape MT, the NVM 88, the external storage device 96, and/or the cartridge memory 48.

It should be noted that the magnetic tape MT in which various pieces of information are stored is an example of a "magnetic tape on which a result of the management processing performed by the magnetic tape management device is recorded" according to the technology of the present disclosure, and the magnetic tape MT, the NVM 88, and/or the external storage device 96 in which various pieces of information are stored are examples of a "first storage medium" and a "second storage medium" according to the technology of the present disclosure.

In addition, various pieces of information stored in the magnetic tape MT, the NVM 88, and/or the external storage device 96 may be output to an external device (for example, a personal computer, a server, and/or a smart device) by the controller 86C. As a result, the quality of the magnetic tape MT can be managed by using various pieces of information stored in the magnetic tape MT, the NVM 88, and/or the external storage device 96.

Figure 19:
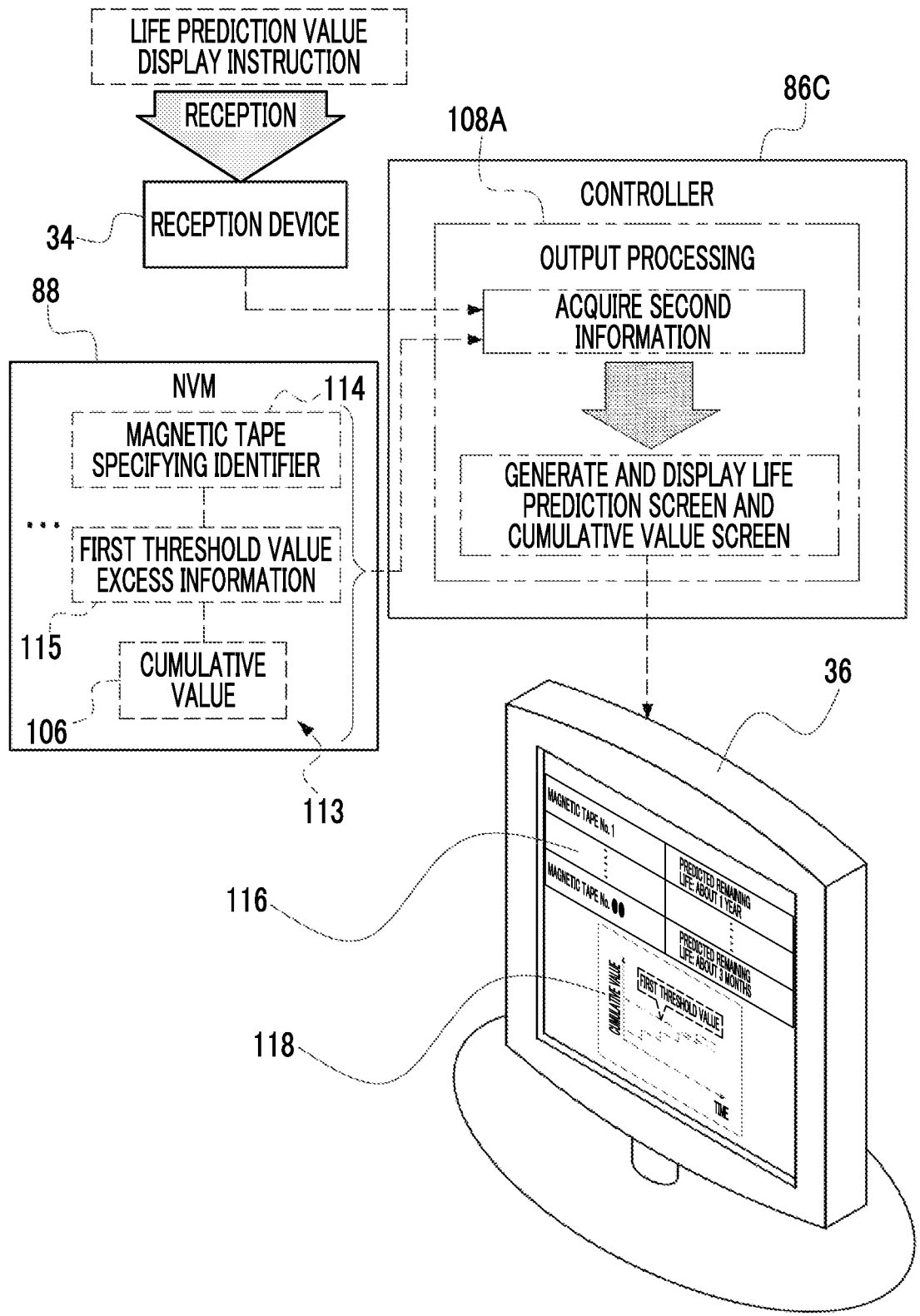
FIG. 19 is a conceptual diagram showing a second modification example of the processing content of the output processing performed by the controller.
Figure 20:
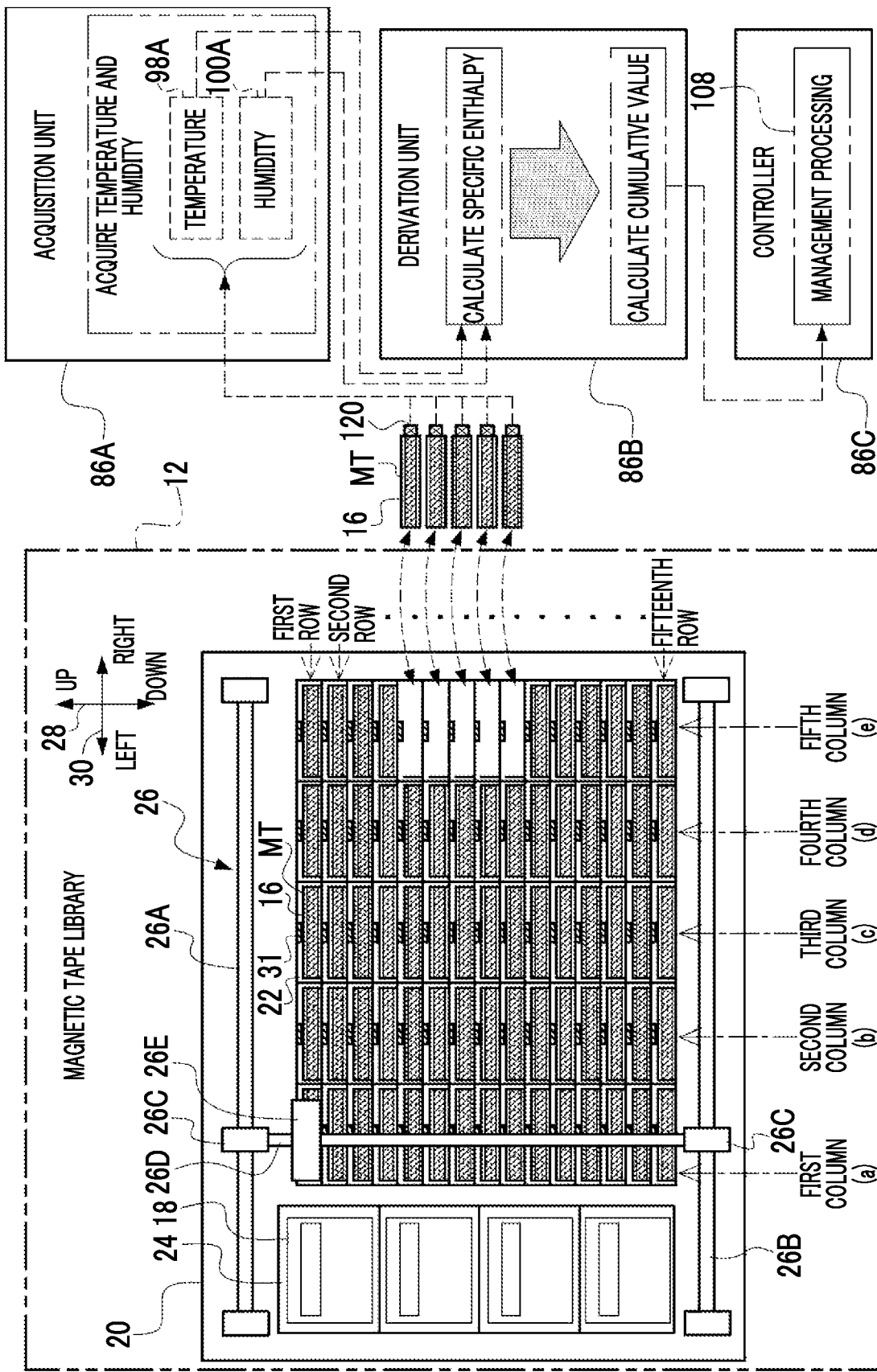
FIG. 20 is a conceptual diagram showing an example of a processing content in a case in which the magnetic tape cartridge is transitorily present outside the magnetic tape library.

In addition, in the embodiment described above, the form example (see FIG. 13) has been described in which the life prediction screen 116 is displayed on the display 36, but the technology of the present disclosure is not limited to this. For example, as shown in FIG. 19, the controller 86C may generate a cumulative value screen 118 based on the second information 113 to display the generated cumulative value screen 118 on the display 36. Examples of the cumulative value screen 118 include a screen including a graph indicating the temporal change of the cumulative value 106. In addition, the cumulative value screen 118 may be a screen in which a graph indicating a temporal history of the cumulative value 106, the first threshold value, the second threshold value, and/or the third threshold value can be compared with each other. In addition, the cumulative value screen 118 may be displayed side by side with the life prediction screen 116, or the life prediction screen 116 and the cumulative value screen 118 may be selectively displayed in response to the instruction received by the reception device 34 and/or various conditions set for the library controller 32. In addition, the contents indicated by the life prediction screen 116 and the cumulative value screen 118 may be output by voice by a speaker or the like.

In addition, in the embodiment described above, the form example has been described in which the output processing 108A and the backup processing 108B are performed as the management processing 108, but the technology of the present disclosure is not limited to this, and only one of the output processing 108A or the backup processing 108B may be performed. In addition, in a case in which the backup processing 108B is performed without performing the output processing 108A, the backup processing 108B may be performed after the alert is activated. In addition, at least one of the output processing 108A or the backup processing 108B may be performed, and the off-track reduction processing 110 is not performed.

In addition, in the embodiment described above, the form example has been described in which the temperature 98 and the humidity 100 are measured by the environment sensor 31 installed in the cartridge accommodation cell 22, but this is merely an example. The environment sensor 31 may be also installed in the magnetic tape drive 18, the temperature 98 and the humidity 100 may also be measured by the environment sensor 31 in the magnetic tape drive 18 even while the magnetic tape cartridge 16 is loaded into the magnetic tape drive 18, and the measurement result may be handled in the same manner as in the embodiment described above. As a result, the temperature 98 and the humidity 100 can be continuously collected over the plurality of periods, and as a result, the cumulative value 106 can be calculated without any omission over the plurality of periods.

In addition, in the embodiment described above, the form example has been described in which the management processing 108 is performed in accordance with the cumulative value 106 of the specific enthalpy 102 based on the temperature 98 and the humidity 100 measured by the environment sensor 31 in the magnetic tape library 12, but this is merely an example. For example, even in a case in which one or more magnetic tape cartridges 16 planned to be accommodated in the magnetic tape library 12 are present outside the magnetic tape library 12 due to transportation of the magnetic tape cartridge 16 or the like, the technology of the present disclosure is established.

In this case, for example, an environment sensor 120 is installed in the magnetic tape cartridge 16 that is present outside the magnetic tape library 12, and a temperature 98A and humidity 100A are measured at regular time intervals (for example, 1 hour interval) by the environment sensor 120. The temperature 98A and the humidity 100A measured by the environment sensor 120 may be transitorily accumulated in the environment sensor 120, and may be acquired by the acquisition unit 86A from the environment sensor 120 on a condition that the magnetic tape cartridge 16 is accommodated in the cartridge accommodation cell 22. In addition, in the environment in which the magnetic tape cartridge 16 is present outside the magnetic tape library 12, the temperature 98A and the humidity 100A may be acquired from the environment sensor 120 by the acquisition unit 86A by measuring the temperature 98A and the humidity 100A at regular time intervals (for example, 1 hour time interval) by the environment sensor 120 and performing communication between the environment sensor 120 and the acquisition unit 86A.

The temperature 98A and the humidity 100A acquired by the acquisition unit 86A in this way are used by the derivation unit 86B to calculate the specific enthalpy 102. The derivation unit 86B calculates the specific enthalpy 102 based on the temperature 98A and the humidity 100A to calculate the cumulative value 106 using the calculated specific enthalpy 102. Then, the controller 86C performs the management processing 108 based on the cumulative value 106. As described above, even in a case in which the magnetic tape cartridge 16 is present outside the magnetic tape library 12, since the management processing 108 is performed by the controller 86C in the same manner as in the embodiment, the same effects as in the embodiment can be obtained.

In addition, in the embodiment described above, the plurality of periods are divided at regular time intervals, but the technology of the present disclosure is not limited to this, and a length of each period does not have to be a regular length, and may be determined at irregular time intervals. For example, the length of each of the plurality of periods may be a length designated by the user 38 or the like. In addition, the length of each period may be a fixed value, or may be a variable value that is changed in response to the instruction received by the reception device 34 and/or various conditions.

In addition, in the embodiment described above, the plurality of periods are divided at regular time intervals, and 1 hour is described as an example of the regular time intervals, but this is merely an example. For example, a unit of the time interval may be about 1 second to 3 months. The lower limit is preferably about 30 seconds, and more preferably equal to or longer than 1 minute. On the other hand, the upper limit is preferably about 1 month, more preferably about 1 day, and still more preferably about 6 hours. In a case in which the time interval is too short, the influences of the fluctuations of the temperature and the humidity of the environment are not transmitted to the magnetic tape MT. In a case in which the time interval is too long, the changes of the temperature and the humidity that can influence the width deformation amount of the magnetic tape MT are averaged, and an appropriate prediction is difficult. For example, in a case in which the time interval exceeds 3 months, there is a concern that the influence of seasonal fluctuations may not be reflected.

In addition, a measurement timing of the temperature and the humidity in each period may be one measurement at the start of each period or the like. Alternately, the temperature and the humidity may be continuously measured for each predetermined time (for example, several seconds), and an average value of the measurement result may be adopted, a most frequent value may be adopted, or a minimum value or a maximum value may be obtained and adopted. In addition, in a case of handling a small number of measurement values having a long interval of the measurement timing, the measurement is easily influenced by the instantaneous fluctuation of the measurement, and in a case in which the interval of the measurement timing is too short, an amount of data is enormous, and thus a load of handling the data is increased. It is desirable that the temperature and the humidity are measured and acquired once for each of 1 second to 86400 seconds. It is desirable to use the acquired average value or most frequent value of the temperature and the humidity, and it is most preferable to use the average value.

In addition, in the embodiment described above, the environment sensor 31 is installed for each cartridge accommodation cell 22, but the technology of the present disclosure is not limited to this. For example, one or more environment sensors 31 may be provided for each row of the cartridge accommodation cells 22, or one or more environment sensors 31 may be provided for each column of the cartridge accommodation cells 22. In addition, one or more environment sensors 31 may be provided for each of several rows to several tens of rows of the cartridge accommodation cells 22, or one or more environment sensors 31 may be provided for each of several columns to several tens of columns of the cartridge accommodation cells 22. In addition, one or more environment sensors 31 may be provided for one magnetic tape library 12. In this case, for example, the environment sensor 31 may be provided in a portion in which the changes of the temperature and the humidity are predicted in advance to be the largest, or conversely, the environment sensor 31 may be provided in a portion in which the changes of the temperature and the humidity are predicted to be the smallest. In addition, the environment sensor 31 may be provided at a portion most influenced by air conditioning, a portion least influenced by air conditioning, or the like.

In addition, one environment sensor 31 may be provided for each of a plurality of division areas obtained by dividing the designated area in the rack 20. For example, a range of the division area may be a range defined in a unit of one or more cartridge accommodation cells 22, may be a range defined in a unit of one row or a plurality of rows of the cartridge accommodation cell 22, may be a range defined in a unit of one column or a plurality of columns of the cartridge accommodation cell 22, may be a range obtained by equally dividing an area designated in the rack 20, or may be a range obtained by non-uniformly dividing an area designated in the rack 20. In addition, the plurality of environment sensors 31 may be provided for each division area. In this case, the statistic value (for example, the average value, the median value, the most frequent value, the maximum value, or the minimum value) of the temperature measured a plurality of times by the plurality of environment sensors 31 in one period for each division area may be acquired by the acquisition unit 86A as the temperature 98. In addition, the statistic value (for example, the average value, the median value, the most frequent value, the maximum value, or the minimum value) of the humidity measured a plurality of times by the plurality of environment sensors 31 in one period for each division area may be acquired by the acquisition unit 86A as the humidity 100. Then, the specific enthalpy 102 may be derived by the derivation unit 86B for each division area, and the management processing 108 based on the specific enthalpy 102 corresponding to each division area may be performed on the magnetic tape MT in the magnetic tape cartridge 16 included in each division area by the controller 86C.

In addition, in the embodiment described above, the management method using the specific enthalpy 102 calculated from the temperature and the wet-bulb temperature is described as an example, but the technology of the present disclosure is not limited to this. For example, the wet-bulb temperature may be obtained from the measurement values of the temperature and the relative humidity and the wet-bulb temperature may be used in the same manner as in the specific enthalpy 102 to perform the management processing or the like on the magnetic tape MT in the same manner as in the embodiment described above. That is, since the wet-bulb temperature exhibits substantially the same characteristics (for example, substantially the same linearity) as the specific enthalpy 102 on the psychrometric diagram, substantially the same effect as in a case of using the specific enthalpy 102 can be obtained. Therefore, the concept of "specific enthalpy" according to the technology of the present disclosure also includes the wet-bulb temperature obtained from measurement values of the temperature and the relative humidity.

In addition, in the embodiment described above, the form example has been described in which the system control program PG is stored in the NVM 88, but the technology of the present disclosure is not limited to this. For example, the system control program PG may be stored in a portable computer-readable non-transitory storage medium, such as an SSD or a USB memory. The system control program PG stored in the non-transitory storage medium is installed in the library controller 32. The processor 86 executes the system control processing described in each embodiment described above in accordance with the system control program PG.

In addition, the system control program PG may be stored in a storage device of another computer, server device, or the like connected to the library controller 32 via the network, and the system control program PG may be downloaded in response to a request of the library controller 32 and installed in the library controller 32.

It should be noted that it is not necessary to store all of the system control program PG in the storage device of the other computer, server device, or the like connected to the library controller 32, or the NVM 88, and a part of various programs may be stored. In addition, the function of the library controller 32 may be realized by cloud computing and the like.

In the embodiment described above, the form example has been described in which the technology of the present disclosure is realized by the software configuration, but the technology of the present disclosure is not limited to this, and a device including an ASIC, an FPGA, or a PLD may be applied. In addition, a combination of the hardware configuration and the software configuration may be used.

As a hardware resource for executing the system control processing described in the embodiment, the following various processors can be used. Examples of the processors include a CPU which is a general-purpose processor functioning as the hardware resource for executing the system control processing by executing software, that is, a program. In addition, examples of the processors include a dedicated electronic circuit which is a processor having a circuit configuration designed to be dedicated to execute specific processing, such as an FPGA, a PLD, or an ASIC. A memory is built in or connected to any processor, and any processor executes the system control processing by using the memory.

The hardware resource for executing the system control processing may be composed of one of these various processors, or may be composed of a combination (for example, a combination of a plurality of FPGAs or a combination of a CPU and an FPGA) of two or more processors of the same type or different types. In addition, the hardware resource for executing the system control processing may be one processor.

As a configuring example of one processor, first, there is a form in which one processor is composed of a combination of one or more CPUs and software and the processor functions as the hardware resource for executing the system control processing. Secondly, as represented by SoC, there is a form in which a processor that realizes the functions of the entire system including a plurality of hardware resources for executing the system control processing with one IC chip is used. As described above, the system control processing is realized by using one or more of the various processors as the hardware resources.

Further, as the hardware structure of these various processors, more specifically, it is possible to use an electronic circuit in which circuit elements, such as semiconductor elements, are combined. In addition, the system control processing described above is merely an example. Therefore, it is needless to say that unnecessary steps may be deleted, new steps may be added, or the processing order may be changed within a range that does not deviate from the gist.

The description contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unnecessary parts may be deleted, new elements may be added, or replacements may be made with respect to the contents described and shown above within a range that does not deviate from the gist of the technology of the present disclosure. In addition, in order to avoid complications and facilitate understanding of the parts according to the technology of the present disclosure, in the description contents and the shown contents above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be described by reference.

In regard to the embodiment described above, the following supplementary notes will be further disclosed.

Supplementary Note 1

A magnetic tape management device comprising a processor, in which the processor acquires a temperature and relative humidity of an environment in which a magnetic tape is stored, derives a wet-bulb temperature using the temperature and the relative humidity, and performs management processing on the magnetic tape in accordance with the wet-bulb temperature.

Supplementary Note 2

The magnetic tape management device according to Supplementary Note 1, in which the management processing is processing in accordance with a statistic value of the wet-bulb temperature.

Supplementary Note 3

The magnetic tape management device according to Supplementary Note 2, in which the processor derives the wet-bulb temperature for each of a plurality of periods, and the statistic value is a statistic value of the wet-bulb temperature derived for each of the plurality of periods.

Supplementary Note 4

The magnetic tape management device according to Supplementary Note 3, in which the plurality of periods are determined by regular time intervals.

Supplementary Note 5

The magnetic tape management device according to any one of Supplementary Notes 2 to 4, in which the statistic value is a cumulative value of the wet-bulb temperature.

Supplementary Note 6

The magnetic tape management device according to any one of Supplementary Notes 2 to 5, in which the management processing includes first output processing of outputting information for specifying that the statistic value exceeds a first threshold value in a case in which the statistic value exceeds the first threshold value.

Supplementary Note 7

The magnetic tape management device according to Supplementary Note 6, in which the first threshold value is a value determined in accordance with a width deformation amount of the magnetic tape.

Supplementary Note 8

The magnetic tape management device according to any one of Supplementary Notes 1 to 7, in which first data is recorded in the magnetic tape, and the management processing includes backup processing of backing up the first data to a medium different from the magnetic tape.

Supplementary Note 9

The magnetic tape management device according to any one of Supplementary Notes 2 to 7 cited in Supplementary Note 8, in which the processor performs the backup processing before the statistic value exceeds a second threshold value and reaches a third threshold value.

Supplementary Note 10

The magnetic tape management device according to Supplementary Note 9, in which at least the third threshold value out of the second threshold value or the third threshold value is a value determined in accordance with a width deformation amount of the magnetic tape.

Supplementary Note 11

The magnetic tape management device according to any one of Supplementary Notes 2 to 7, Supplementary Note 2 cited in Supplementary Note 8, Supplementary Note 3 cited in Supplementary Note 8, Supplementary Note 4 cited in Supplementary Note 8, Supplementary Note 5 cited in Supplementary Note 8, Supplementary Note 6 cited in Supplementary Note 8, Supplementary Note 7 cited in Supplementary Note 8, Supplementary Note 9, or Supplementary Note 10, in which the management processing includes second output processing of outputting information on the statistic value.

Supplementary Note 12

The magnetic tape management device according to any one of Supplementary Notes 1 to 11, in which a magnetic tape cartridge that accommodates the magnetic tape is stored in the environment.

Supplementary Note 13

The magnetic tape management device according to Supplementary Note 12, in which a plurality of the magnetic tape cartridges are stored in the environment.

Supplementary Note 14

A magnetic tape cartridge comprising a first storage medium in which a result of the management processing performed by the magnetic tape management device according to any one of Supplementary Notes 1 to 13 is stored.

Supplementary Note 15

A magnetic tape in which a result of the management processing performed by the magnetic tape management device according to any one of Supplementary Notes 1 to 13 is recorded.

Supplementary Note 16

A magnetic tape system comprising a second storage medium in which a result of the management processing performed by the magnetic tape management device according to any one of Supplementary Notes 1 to 13 is stored, and a control device that is operated based on the result stored in the second storage medium.

Supplementary Note 17

The magnetic tape system according to Supplementary Note 16, further comprising the magnetic tape management device according to any one of Supplementary Notes 1 to 13.

Supplementary Note 18

The magnetic tape system according to Supplementary Note 17, further comprising a rack in which a plurality of magnetic tape cartridges that accommodate a plurality of the magnetic tapes managed by the magnetic tape management device are freely taken in and out.

Supplementary Note 19

A magnetic tape management method comprising acquiring a temperature and humidity of an environment in which a magnetic tape is stored, deriving a wet-bulb temperature using the temperature and the humidity, and performing management processing on the magnetic tape in accordance with the wet-bulb temperature.

Supplementary Note 20

A program causing a computer to execute a process comprising acquiring a temperature and humidity of an environment in which a magnetic tape is stored, deriving a wet-bulb temperature using the temperature and the humidity, and performing management processing on the magnetic tape in accordance with the wet-bulb temperature.

What is claimed is:
1. A magnetic tape management device comprising:
a processor,
wherein the processor
acquires a temperature and humidity of an environment in which a magnetic tape is stored,
derives a specific enthalpy using the temperature and the humidity, and
performs management processing on the magnetic tape in accordance with the specific enthalpy,
wherein the management processing is processing in accordance with a statistic value of the specific enthalpy, wherein the management processing includes first output processing of outputting information for specifying that the statistic value exceeds a first threshold value in a case in which the statistic value exceeds the first threshold value, and wherein the first threshold value is a value determined in accordance with a width deformation amount of the magnetic tape.

2. The magnetic tape management device according to claim 1, wherein the processor derives the specific enthalpy for each of a plurality of periods, and the statistic value is a statistic value of the specific enthalpy derived for each of the plurality of periods.

3. The magnetic tape management device according to claim 2, wherein the plurality of periods are determined by regular time intervals.

4. The magnetic tape management device according to claim 1, wherein the statistic value is a cumulative value of the specific enthalpy.

5. The magnetic tape management device according to claim 1, wherein first data is recorded in the magnetic tape, and the management processing includes backup processing of backing up the first data to a medium different from the magnetic tape.

6. The magnetic tape management device according to claim 1, wherein the management processing includes second output processing of outputting information on the statistic value.

7. The magnetic tape management device according to claim 1, wherein a magnetic tape cartridge that accommodates the magnetic tape is stored in the environment.

8. The magnetic tape management device according to claim 7, wherein a plurality of the magnetic tape cartridges are stored in the environment.

9. A magnetic tape management method comprising:

acquiring a temperature and humidity of an environment in which a magnetic tape is stored;

deriving a specific enthalpy using the temperature and the humidity; and performing management processing on the magnetic tape in accordance with the specific enthalpy, wherein the management processing is processing in accordance with a statistic value of the specific enthalpy, wherein the management processing includes first output processing of outputting information for specifying that the statistic value exceeds a first threshold value in a case in which the statistic value exceeds the first threshold value, and wherein the first threshold value is a value determined in accordance with a width deformation amount of the magnetic tape.

10. The magnetic tape management method according to claim 9, wherein the specific enthalpy is determined for each of a plurality of periods, and the statistic value is a statistic value of the specific enthalpy derived for each of the plurality of periods.

11. The magnetic tape management method according to claim 10, wherein the plurality of periods are determined by regular time intervals.

12. The magnetic tape management method according to claim 9, wherein first data is recorded in the magnetic tape, and the management processing includes backup processing of backing up the first data to a medium different from the magnetic tape.

13. The magnetic tape management method according to claim 9, wherein the management processing includes second output processing of outputting information on the statistic value.

14. The magnetic tape management method according to claim 9, wherein a magnetic tape cartridge that accommodates the magnetic tape is stored in the environment.

15. The magnetic tape management method according to claim 14, wherein a plurality of magnetic tape cartridges are stored in the environment.

16. The magnetic tape management method according to claim 9, wherein the statistic value is a cumulative value of the specific enthalpy.

17. A magnetic tape management device comprising:

a processor, wherein the processor acquires a temperature and humidity of an environment in which a magnetic tape is stored, derives a specific enthalpy using the temperature and the humidity, and performs management processing on the magnetic tape in accordance with the specific enthalpy, wherein the management processing is processing in accordance with a statistic value of the specific enthalpy, and wherein first data is recorded in the magnetic tape, the management processing includes backup processing of backing up the first data to a medium different from the magnetic tape, and the processor performs the backup processing before the statistic value exceeds a second threshold value and reaches a third threshold value.

18. The magnetic tape management device according to claim 17, wherein at least the third threshold value out of the second threshold value or the third threshold value is a value determined in accordance with a width deformation amount of the magnetic tape.

* * * * *